US012159567B2

(12) United States Patent
Chang et al.

(10) Patent No.: US 12,159,567 B2
(45) Date of Patent: Dec. 3, 2024

(54) GAMMA TAP VOLTAGE GENERATING CIRCUITS AND DISPLAY DEVICES INCLUDING THE SAME

(71) Applicant: Samsung Electronics Co., Ltd., Suwon-si (KR)

(72) Inventors: Ying-Da Chang, Suwon-si (KR); Chulho Choi, Suwon-si (KR); Yu-Chieh Huang, Suwon-si (KR); Ching-Chieh Wu, Suwon-si (KR); Hajoon Shin, Suwon-si (KR); Zhen-Guo Ding, Suwon-si (KR); Jia-Way Chen, Suwon-si (KR); Kyunlyeol Lee, Suwon-si (KR); Yongjoo Song, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 18/466,892

(22) Filed: Sep. 14, 2023

(65) Prior Publication Data

US 2024/0135859 A1 Apr. 25, 2024
US 2024/0233609 A9 Jul. 11, 2024

(30) Foreign Application Priority Data

Oct. 21, 2022 (KR) ........................ 10-2022-0136556

(51) Int. Cl.
*G09G 3/20* (2006.01)
*G09G 3/36* (2006.01)

(52) U.S. Cl.
CPC ......... *G09G 3/2096* (2013.01); *G09G 3/3696* (2013.01); *G09G 2310/0267* (2013.01); *G09G 2310/0291* (2013.01); *G09G 2320/0626* (2013.01); *G09G 2320/0673* (2013.01)

(58) Field of Classification Search
CPC ............... G09G 3/2096; G09G 3/3696; G09G 2310/0267; G09G 2310/0291; G09G 2320/0626; G09G 2320/0673
See application file for complete search history.

(56) References Cited

U.S. PATENT DOCUMENTS

| | | | |
|---|---|---|---|
| 8,605,122 | B2 | 12/2013 | Weng |
| 8,743,102 | B2 | 6/2014 | Woo et al. |
| 9,390,680 | B2 | 7/2016 | Jeon et al. |
| 10,297,187 | B2 | 5/2019 | Bang |
| 11,132,978 | B2 | 9/2021 | Lee et al. |

(Continued)

*Primary Examiner* — Michael J Jansen, II
(74) *Attorney, Agent, or Firm* — Myers Bigel, P.A.

(57) ABSTRACT

A gamma tap circuit includes: (i) a first gamma division circuit configured to generate a first gamma tap voltage by performing voltage division of an upper gamma tap voltage and a lower gamma tap voltage, in-sync with a first clock signal CK1 and a first complementary clock signal CK1*b*, which is 180° out-of-phase relative to CK1, (ii) a second gamma division circuit configured to generate a second gamma tap voltage by performing voltage division of the upper gamma tap voltage and the first gamma tap voltage, in-sync with a second clock signal CK2 and a second complementary clock signal CK2*b*, which is 180° out-of-phase relative to CK2, and (iii) a third gamma division circuit configured to generate a third gamma tap voltage by performing voltage division of the first gamma tap voltage and the lower gamma tap voltage, in response to CK2 and CK2*b*, which have a lower frequency relative to CK1 and CK1*b*.

23 Claims, 14 Drawing Sheets

(56) References Cited

U.S. PATENT DOCUMENTS

| | | | | |
|---|---|---|---|---|
| 11,276,370 | B2 | 3/2022 | Kim et al. | |
| 2006/0087483 | A1* | 4/2006 | Takada | G09G 3/3688 345/89 |
| 2010/0265274 | A1* | 10/2010 | Han | G09G 3/3688 345/89 |
| 2011/0012882 | A1* | 1/2011 | Jeong | G09G 3/3696 345/87 |
| 2012/0105516 | A1* | 5/2012 | Shoji | G09G 3/296 345/63 |
| 2012/0162272 | A1* | 6/2012 | Lee | G09G 5/10 345/690 |
| 2013/0271507 | A1* | 10/2013 | Kim | G09G 3/3291 345/77 |
| 2015/0170609 | A1* | 6/2015 | Jung | G09G 3/20 345/212 |
| 2015/0339987 | A1* | 11/2015 | Han | G09G 3/3696 345/89 |
| 2017/0018249 | A1* | 1/2017 | Lim | G09G 3/3696 |
| 2018/0096666 | A1* | 4/2018 | Chung | G09G 3/3696 |
| 2020/0013344 | A1* | 1/2020 | Jeon | G09G 3/3275 |
| 2021/0005158 | A1* | 1/2021 | Huang | G09G 3/3208 |
| 2021/0118352 | A1* | 4/2021 | Baek | G09G 3/2007 |
| 2022/0262317 | A1* | 8/2022 | Hung | G09G 3/3275 |
| 2023/0063319 | A1* | 3/2023 | Kim | G09G 3/20 |
| 2023/0197014 | A1* | 6/2023 | Lee | G09G 3/3275 |
| 2023/0318553 | A1* | 10/2023 | Lee | H03F 3/45475 330/250 |
| 2024/0005877 | A1* | 1/2024 | Kwon | G09G 3/3275 |
| 2024/0135859 | A1* | 4/2024 | Chang | G09G 3/2096 |
| 2024/0144854 | A1* | 5/2024 | Tark | G09G 3/3655 |
| 2024/0194163 | A1* | 6/2024 | Kim | G09G 3/32 |

* cited by examiner

GAMMA TAP VOLTAGE GENERATING CIRCUITS AND DISPLAY DEVICES INCLUDING THE SAME

REFERENCE TO PRIORITY APPLICATION

This application claims priority under 35 U.S.C. § 119 to Korean Patent Application No. 10-2022-0136556, filed Oct. 21, 2022, the disclosure of which is hereby incorporated herein by reference.

BACKGROUND

Embodiments of the present disclosure described herein relate to integrated circuit devices that can drive a display and, more particularly, to gamma tap circuits and display devices including the same.

A display device is a device that displays images corresponding to image data to a user. Nowadays, a flat panel display device whose size and weight are smaller than those of a cathode ray tube (CRT) are mainly used. As will be understood by those skilled in the art, a flat panel display device may be implemented with a liquid crystal display (LCD), a field emission display (FED), a plasma display panel (PDP), an organic light emitting display (OLED), or the like.

In general, a display device includes a display panel and a driver circuit. The image panel includes a plurality of pixels, and the driver circuit may control brightness of each of the plurality of pixels to display an image corresponding to image data. Unfortunately, the actual luminance of image data and the luminance perceived by the user's eye may be different. To compensate for such differences, the driver circuit may utilize a gamma voltage generator to generates a gamma curve used in image processing.

SUMMARY

Embodiments of the present disclosure provide a gamma tap circuit that generates a gamma tap voltage and a display device including the same.

According to an embodiment, a gamma tap circuit includes a first gamma division circuit, which is configured to generate a first gamma tap voltage by performing voltage division on an upper gamma tap voltage and a lower gamma tap voltage in-sync with a first clock signal CK1 and a first complementary clock signal CK1*b* that is 180° out-of-phase relative to CK1. A second gamma division circuit is also provided, which is configured to generate a second gamma tap voltage by performing voltage division on the upper gamma tap voltage and the first gamma tap voltage in-sync with a second clock signal CK2 and a second complementary clock signal CK2*b* that is 180° out-of-phase relative to CK2. And, a third gamma division circuit is provided, which is configured to generate a third gamma tap voltage by performing voltage division on the first gamma tap voltage and the lower gamma tap voltage in-sync with CK2 and CK2*b*, which have a lower frequency relative to CK1 and CK1*b*. In some of these embodiments, the first gamma division circuit may be configured to generate the first gamma tap voltage by performing voltage division on a summation of the upper gamma tap voltage and the lower gamma tap voltage. For example, the first gamma division circuit may be configured to generate the first gamma tap voltage having a magnitude that is proportional to a summation of the upper gamma tap voltage and the lower gamma tap voltage.

According to another embodiment, a gamma tap circuit includes: (i) a first gamma division circuit that generates a first gamma tap voltage by voltage division of an upper gamma tap voltage and a lower gamma tap voltage, in response to a first clock signal and a first complementary clock signal, (ii) a second gamma division circuit that generates a second gamma tap voltage by voltage division of the upper gamma tap voltage and the first gamma tap voltage, in response to a second clock signal and a second complementary clock signal, and (iii) a third gamma division circuit that generates a third gamma tap voltage by voltage division of the first gamma tap voltage and the lower gamma tap voltage, in response to the second clock signal and the second complementary clock signal. In some of these embodiments, the first gamma division circuit includes: (i) a first switch that is connected between a first input node of receiving the upper gamma tap voltage and a first node and operates in response to the first clock signal, (ii) a second switch that is connected between the first node and a second node and operates in response to the first complementary clock signal, (iii) a third switch that is connected between a second input node of receiving the lower gamma tap voltage and the first node and operates in response to the first complementary clock signal, (iv) a fourth switch that is connected between the second input node and the second node and operates in response to the first clock signal, (v) a first resistor that is connected between the first node and a third node, (vi) a second resistor that is connected between the second node and the third node, and (vii) a first amplifier that amplifies a voltage of the third node and to output the first gamma tap voltage to a first output node.

According to a further embodiment, a gamma tap circuit includes a first switch that is connected between a first input node of receiving an upper gamma tap voltage and a first node and operates in response to a clock signal, a second switch that is connected between the first input node and a second node and operates in response to a complementary clock signal, a third switch that is connected between a second input node of receiving a lower gamma tap voltage and the first node and operates in response to the complementary clock signal, a fourth switch that is connected between the second input node and the second node and operates in response to the clock signal, a first resistor that is connected between the first node and a third node, a second resistor that is connected between the second node and the third node, and an amplifier that amplifies a voltage of the third node and to output a gamma tap voltage to an output node.

According to an additional embodiment, a display device includes a display panel that includes a plurality of pixels, a timing controller that generates a first control signal, a second control signal, and a third control signal, a gamma voltage generator that generates a plurality of gamma voltages based on the first control signal, a data driver that generates a data signal for controlling brightness of the plurality of pixels based on the second control signal and the plurality of gamma voltages, and a scan driver that generates a scan signal for controlling whether the plurality of pixels emit light, in response to the third control signal. In some of these embodiments, the gamma voltage generator may include an adjustment circuit that generates a first clock signal and a first complementary clock signal in response to the first control signal, a first gamma division circuit that generates a first gamma tap voltage by voltage division of an upper gamma tap voltage and a lower gamma tap voltage, in response to the first clock signal and the first complementary clock signal, and a gamma resistor string that provides the plurality of gamma voltages based on the upper gamma tap voltage, the lower gamma tap voltage, and the first gamma tap voltage. The first gamma division circuit includes a first switch that is connected between a first input node of receiving the upper gamma tap voltage and a first node and operates in response to the first clock signal, a second switch that is connected between the first input node and a second node and operates in response to the first complementary clock signal, a third switch that is connected between a second input node of receiving the lower gamma tap voltage and the first node and operates in response to the first complementary clock signal, a fourth switch that is connected between the second input node and the second node and operates in response to the first clock signal, a first resistor that is connected between the first node and a third node, a second resistor that is connected between the second node and the third node, and a first amplifier that amplifies a voltage of the third node and to output the first gamma tap voltage to a first output node.

BRIEF DESCRIPTION OF THE FIGURES

The above and other objects and features of the present disclosure will become apparent by describing in detail embodiments thereof with reference to the accompanying drawings.

DETAILED DESCRIPTION

Below, embodiments of the present disclosure will be described in detail and clearly to such an extent that one skilled in the art implements embodiment of the present disclosure easily.

Components described in the detailed description with reference to terms "part", "unit", "module", "layer", etc. and function blocks illustrated in drawings may be implemented in the form of software, hardware, or a combination thereof. For example, the software may be a machine code, firmware, an embedded code, and application software. For example, the hardware may include an electrical circuit, an electronic circuit, a processor, a computer, an integrated circuit, integrated circuit cores, a pressure sensor, an inertial sensor, a microelectromechanical system (MEMS), a passive element, or a combination thereof.

Figure 1:
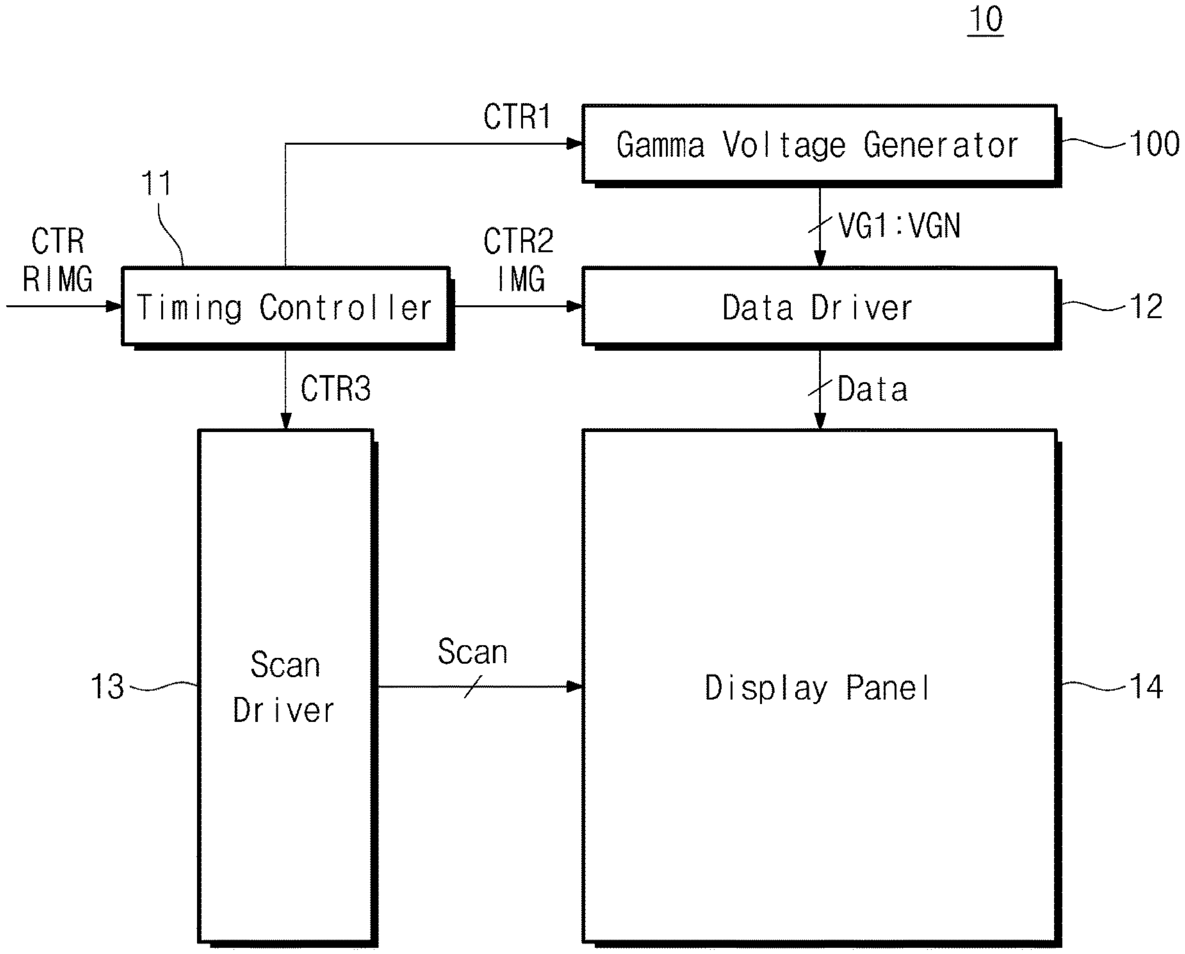
FIG. 1 is a block diagram of a display device according to an embodiment of the present disclosure.

FIG. 1 is a block diagram of a display device according to an embodiment of the present disclosure. Referring to FIG. 1, a display device 10 may receive image data from the outside and may display an image corresponding to the image data to a user. The display device 10 may include a timing controller 11, a data driver 12, a scan driver 13, a display panel 14, and a gamma voltage generator 100. The timing controller 11, the data driver 12, the scan driver 13, and the gamma voltage generator 100 may be integrated circuits for driving the display panel 14.

The timing controller 11 may receive raw image data RIMG and a control signal CTR from an external device. The timing controller 11 may generate image data IMG based on the raw image data RIMG. For example, the timing controller 11 may generate the image data IMG by applying an algorithm for correcting an image quality to the raw image data RIMG. The timing controller 11 may generate a first control signal CTR1, a second control signal CTR2, and a third control signal CTR3, in response to the image data IMG and the control signal CTR. The timing controller 11 may control timings to drive the gamma voltage generator 100, the data driver 12, and the scan driver 13 in response to the first to third control signals CTR1, CTR2, and CTR3.

The gamma voltage generator 100 may receive the first control signal CTR1 from the timing controller 11. The gamma voltage generator 100 may further receive a first reference voltage and a second reference voltage from the external device or a voltage regulator. The gamma voltage generator 100 may generate a plurality of gamma voltages VG1 to VGN corresponding to a gamma curve, in response to the first control signal CTR1, the first reference voltage, and the second reference voltage. Herein, "N" is an arbitrary natural number.

The gamma curve may refer to a function that determines the correlation between luminance of the image data IMG and luminance of an image to be displayed by the display device 10. For example, the human eye may be sensitive to a gray scale (or gradation) difference in a dark environment but may be insensitive to a gray scale (or gradation) difference in a bright environment. The gamma curve may nonlinearly correct luminance of image data in consideration of a characteristic that the human eye perceives brightness. The gamma voltage generator 100 will be described in detail with reference to FIG. 2.

In some embodiments, 896 gamma voltages VG1 to VG896 may be output from the gamma voltage generator 100. However, the present disclosure is not limited thereto. The number of gamma voltages generated by the gamma voltage generator 100 may increase or decrease. The gamma voltages may be also referred to as "linear gamma voltages".

The data driver 12 may receive the second control signal CTR2 and the image data IMG from the timing controller 11. The data driver 12 may receive the plurality of gamma voltages VG1 to VGN from the gamma voltage generator 100. The data driver 12 may generate a data signal in response to the second control signal CTR2, the image data IMG, and the plurality of gamma voltages VG1 to VGN. The data driver 12 may output the data signal to the display panel 14. The data signal may refer to a signal that controls brightness of the pixels of the display panel 14.

The scan driver 13 may receive the third control signal CTR3 from the timing controller 11. The scan driver 13 may output a scan signal in response to the third control signal CTR3. The scan driver 13 may output the scan signal to the display panel 14. The scan signal may refer to a signal that controls whether the pixels of the display panel 14 emit light.

The display panel 14 may receive the data signal from the data driver 12. The display panel 14 may receive the scan signal from the scan driver 13. The display panel 14 may include the plurality of pixels. Each of the plurality of pixels may emit corresponding light in response to the data signal and the scan signal.

For example, the display panel 14 may include a plurality of scan lines extending in a first direction and a plurality of data lines extending in a second direction perpendicular to the first direction. The display panel 14 may include the plurality of pixels formed at intersections of the plurality of scan lines and the plurality of data lines. A pixel may emit light in response to a scan signal supplied through the corresponding scan line and a data signal supplied through the corresponding data line.

Figure 2:
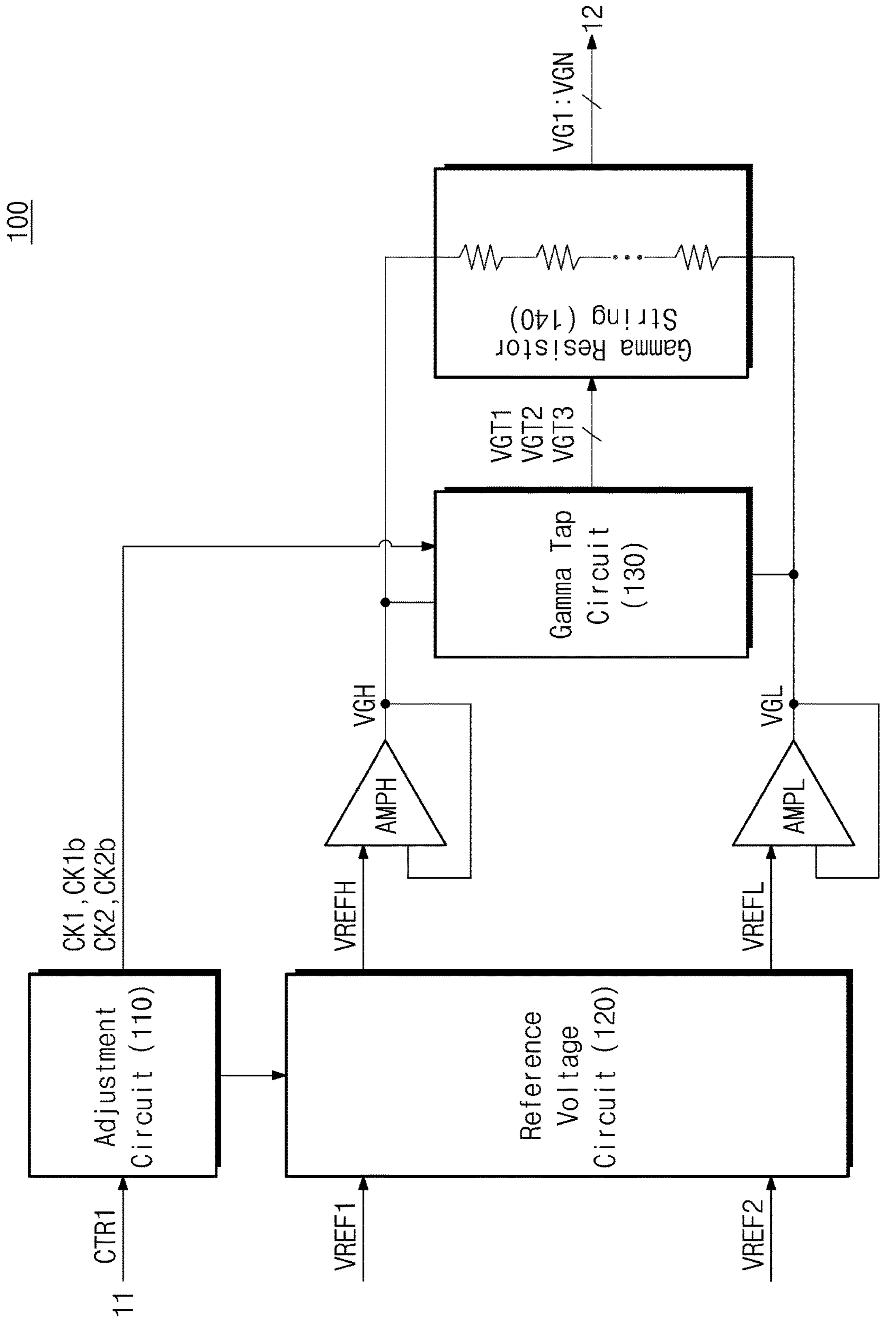
FIG. 2 is a diagram illustrating a gamma voltage generator of FIG. 1 according to some embodiments of the present disclosure.

FIG. 2 is a diagram illustrating a gamma voltage generator of FIG. 1 according to some embodiments of the present disclosure. Referring to FIGS. 1 and 2, the gamma voltage generator 100 may receive the first control signal CTR1 from the timing controller 11. The gamma voltage generator 100 may further receive a first reference voltage VREF1 and a second reference voltage VREF2 from the external device or the voltage regulator. The first and second reference voltages VREF1 and VREF2 may be also referred to as "external gamma sources". A voltage level of the second reference voltage VREF2 may be greater than a voltage level of the first reference voltage VREF1. The gamma voltage generator 100 may generate the plurality of gamma voltages VG1 to VGN in response to the first control signal CTR1, the first reference voltage VREF1, and the second reference voltage VREF2.

The gamma voltage generator 100 may include an adjustment circuit 110, a reference voltage circuit 120, a gamma tap circuit 130, and a gamma resistor string 140. The adjustment circuit 110 may receive the first control signal CTR1 from the timing controller 11. The adjustment circuit 110 may control the reference voltage circuit 120 in response to the first control signal CTR1. The adjustment circuit 110 may generate a first clock signal CK1, a first complementary clock signal CK1*b*, a second clock signal CK2, and a second complementary clock signal CK2*b* in response to the first control signal CTR1.

As explained herein, the clock signals CK1 and CK1*b* have the same frequency by are out of phase from each other by 180° (i.e., one-half period T). Likewise, the clock signals CK1 and CK2*b* have the same frequency by are out of phase from each other by 180° (i.e., one-half period T). Thus, when the voltage level of the first clock signal CK1 corresponds to a logic high state, the voltage level of the first complementary clock signal CK1*b* may correspond to a logic low state. When the voltage level of the first clock signal CK1 corresponds to the logic low state, the voltage level of the first complementary clock signal CK1*b* may correspond to the logic high state. The same relationship applies to CK2 and CK2*b*. In some embodiments, the frequency of the first clock signal CK1 may be greater than the frequency of the second clock signal CK2. The clock signals CK1, CK1*b*, CK2, and CK2*b* will be described in detail with reference to FIG. 5.

The reference voltage circuit 120 may receive the first reference voltage VREF1 and the second reference voltage VREF2 from the external device or the voltage regulator. Under control of the adjustment circuit 110, the reference voltage circuit 120 may determine an upper reference gamma voltage VREFH and a lower reference gamma voltage VREFL, in response to the first reference voltage VREF1 and the second reference voltage VREF2.

For example, the reference voltage circuit 120 may include a reference resistor string, a first multiplexer, and a second multiplexer. The reference resistor string may be connected between a node of receiving the first reference voltage VREF1 and a node of receiving the second reference voltage VREF2. The reference resistor string may be implemented with a plurality of resistors connected in series. Inputs of the first multiplexer and inputs of the second multiplexer may be connected with the reference resistor string. The adjustment circuit 110 may select one of the inputs of the first multiplexer as the upper reference gamma voltage VREFH and may select one of the inputs of the second multiplexer as the lower reference gamma voltage VREFL.

An upper amplifier AMPH may generate an upper gamma tap voltage VGH in response to the upper reference gamma voltage VREFH. For example, a non-inverting input terminal of the upper amplifier AMPH may be connected with a node of receiving the upper reference gamma voltage VREFH. Both an inverting input terminal and an output terminal of the upper amplifier AMPH may be connected with a node of outputting the upper gamma tap voltage VGH.

A lower amplifier AMPL may generate a lower gamma tap voltage VGL in response to the lower reference gamma voltage VREFL. For example, a non-inverting input terminal of the lower amplifier AMPL may be connected with a node of receiving the lower reference gamma voltage VREFL. Both an inverting input terminal and an output terminal of the lower amplifier AMPL may be connected with a node of outputting the lower gamma tap voltage VGL.

The gamma tap circuit 130 may receive the upper gamma tap voltage VGH from the upper amplifier AMPH. The gamma tap circuit 130 may receive the lower gamma tap voltage VGL from the lower amplifier AMPL. The gamma tap circuit 130 may receive the first clock signal CK1, the first complementary clock signal CK1*b*, the second clock signal CK2, and the second complementary clock signal CK2*b* from the adjustment circuit 110.

The gamma tap circuit 130 may generate a first gamma tap voltage VGT1, a second gamma tap voltage VGT2, and a third gamma tap voltage VGT3, in response to the clock signals CK1, CK1*b*, CK2, and CK2*b*, the upper gamma tap voltage VGH, and the lower gamma tap voltage VGL. The first gamma tap voltage VGT1 may be generated by performing voltage division of the upper gamma tap voltage VGH and the lower gamma tap voltage VGL. The second gamma tap voltage VGT2 may be generated by performing voltage division of the upper gamma tap voltage VGH and the first gamma tap voltage VGT1. The third gamma tap voltage VGT3 may be generated by performing voltage division of the first gamma tap voltage VGT1 and the lower gamma tap voltage VGL. The gamma tap circuit 130 may provide the first, second, and third gamma tap voltages VGT1, VGT2, and VGT3 to the gamma resistor string 140. The gamma tap circuit 130 will be described in detail with reference to FIGS. 3 and 4.

For better understanding of the present disclosure, the description will be given assuming the gamma tap circuit 130 of FIG. 2 generates the first, second, and third gamma tap voltages VGT1, VGT2, and VGT3, but the present disclosure is not limited thereto. The number of gamma tap voltages generated by the gamma tap circuit 130 may be more or less than “3”. For example, a gamma tap circuit that generates one gamma tap voltage will be described with reference to FIGS. 8 and 9.

The gamma resistor string 140 may receive the upper gamma tap voltage VGH from the upper amplifier AMPH. The gamma resistor string 140 may receive the lower gamma tap voltage VGL from the lower amplifier AMPL. The gamma resistor string 140 may receive the first, second, and third gamma tap voltages VGT1, VGT2, and VGT3 from the gamma tap circuit 130. The gamma resistor string 140 may provide the plurality of gamma voltages VG1 to VGN to the data driver 12, in response to the upper gamma tap voltage VGH, the lower gamma tap voltage VGL, and at least one gamma tap voltage (e.g., the first, second, and third gamma tap voltages VGT1, VGT2, and VGT3). The gamma resistor string 140 may be implemented with a plurality of resistors connected in series.

Figure 3:
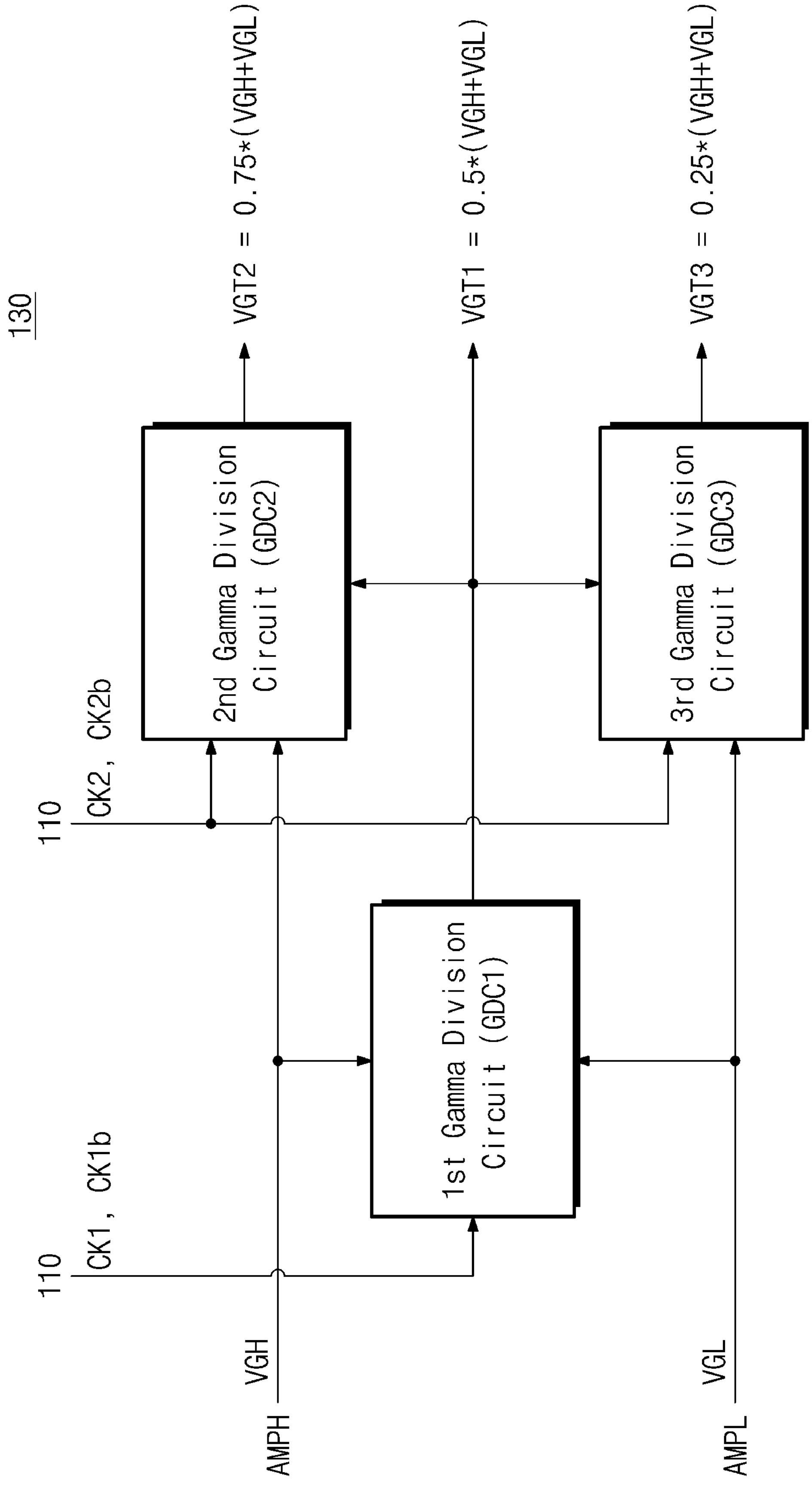
FIG. 3 is a diagram describing a gamma tap circuit of FIG. 2 according to some embodiments of the present disclosure.

FIG. 3 is a diagram describing a gamma tap circuit of FIG. 2 according to some embodiments of the present disclosure. Referring to FIGS. 2 and 3, the gamma tap circuit 130 may receive the upper gamma tap voltage VGH from the upper amplifier AMPH, may receive the lower gamma tap voltage VGL from the lower amplifier AMPL, and may receive the clock signals CK1, CK1*b*, CK2, and CK2*b* from the adjustment circuit 110.

The gamma tap circuit 130 may be a triple gamma tap circuit that generates the first, second, and third gamma tap voltages VGT1, VGT2, and VGT3. The triple gamma tap circuit may generate three gamma tap voltages in response to the upper gamma tap voltage VGH and the lower gamma tap voltage VGL. The gamma tap circuit 130 may include a first gamma division circuit GDC1, a second gamma division circuit GDC2, and a third gamma division circuit GDC3.

The first gamma division circuit GDC1 may receive the first clock signal CK1 and the first complementary clock signal CK1*b* from the adjustment circuit 110. The first gamma division circuit GDC1 may generate the first gamma tap voltage VGT1 by the voltage division of the upper gamma tap voltage VGH and the lower gamma tap voltage VGL, in response to the first clock signal CK1 and the first complementary clock signal CK1*b*.

For example, the voltage level of the first gamma tap voltage VGT1 may be half the sum of the voltage level of the upper gamma tap voltage VGH and the voltage level and the lower gamma tap voltage VGL. The voltage level of the first gamma tap voltage VGT1 may be expressed by using the upper gamma tap voltage VGH and the lower gamma tap voltage VGL as follow: VGT1=0.5*(VGH+VGL). Herein, VGT1 represents a first gamma tap voltage, VGH represents an upper gamma tap voltage, and VGL represents a lower gamma tap voltage.

The first gamma division circuit GDC1 may provide the first gamma tap voltage VGT1 to the second gamma division circuit GDC2, the third gamma division circuit GDC3, and the gamma resistor string 140. The second gamma division circuit GDC2 may receive the second clock signal CK2 and the second complementary clock signal CK2*b* from the adjustment circuit 110. The second gamma division circuit GDC2 may generate the second gamma tap voltage VGT2 by the voltage division of the upper gamma tap voltage VGH and the first gamma tap voltage VGT1, in response to the second clock signal CK2 and the second complementary clock signal CK2*b*.

For example, the voltage level of the second gamma tap voltage VGT2 may be half the sum of the voltage level of the upper gamma tap voltage VGH and the voltage level of the first gamma tap voltage VGT1. The voltage level of the second gamma tap voltage VGT2 may be expressed by using the upper gamma tap voltage VGH and the lower gamma tap voltage VGL as follow: VGT2=0.75*(VGH+VGL). Herein, VGT2 represents a second gamma tap voltage, VGH represents an upper gamma tap voltage, and VGL represents a lower gamma tap voltage. The second gamma division circuit GDC2 may provide the second gamma tap voltage VGT2 to the gamma resistor string 140.

The third gamma division circuit GDC3 may receive the second clock signal CK2 and the second complementary clock signal CK2*b* from the adjustment circuit 110. The third gamma division circuit GDC3 may generate the third gamma tap voltage VGT3 by the voltage division of the first gamma tap voltage VGT1 and the lower gamma tap voltage VGL, in response to the second clock signal CK2 and the second complementary clock signal CK2*b*.

For example, the voltage level of the third gamma tap voltage VGT3 may be half the sum of the voltage level of the first gamma tap voltage VGT1 and the voltage level of the lower gamma tap voltage VGL. The voltage level of the third gamma tap voltage VGT3 may be expressed by using the upper gamma tap voltage VGH and the lower gamma tap voltage VGL as follow: VGT3=0.25*(VGH+VGL). Herein, VGT3 represents a third gamma tap voltage, VGH represents an upper gamma tap voltage, and VGL represents a lower gamma tap voltage. The third gamma division circuit GDC3 may provide the third gamma tap voltage VGT3 to the gamma resistor string 140.

Figure 4:
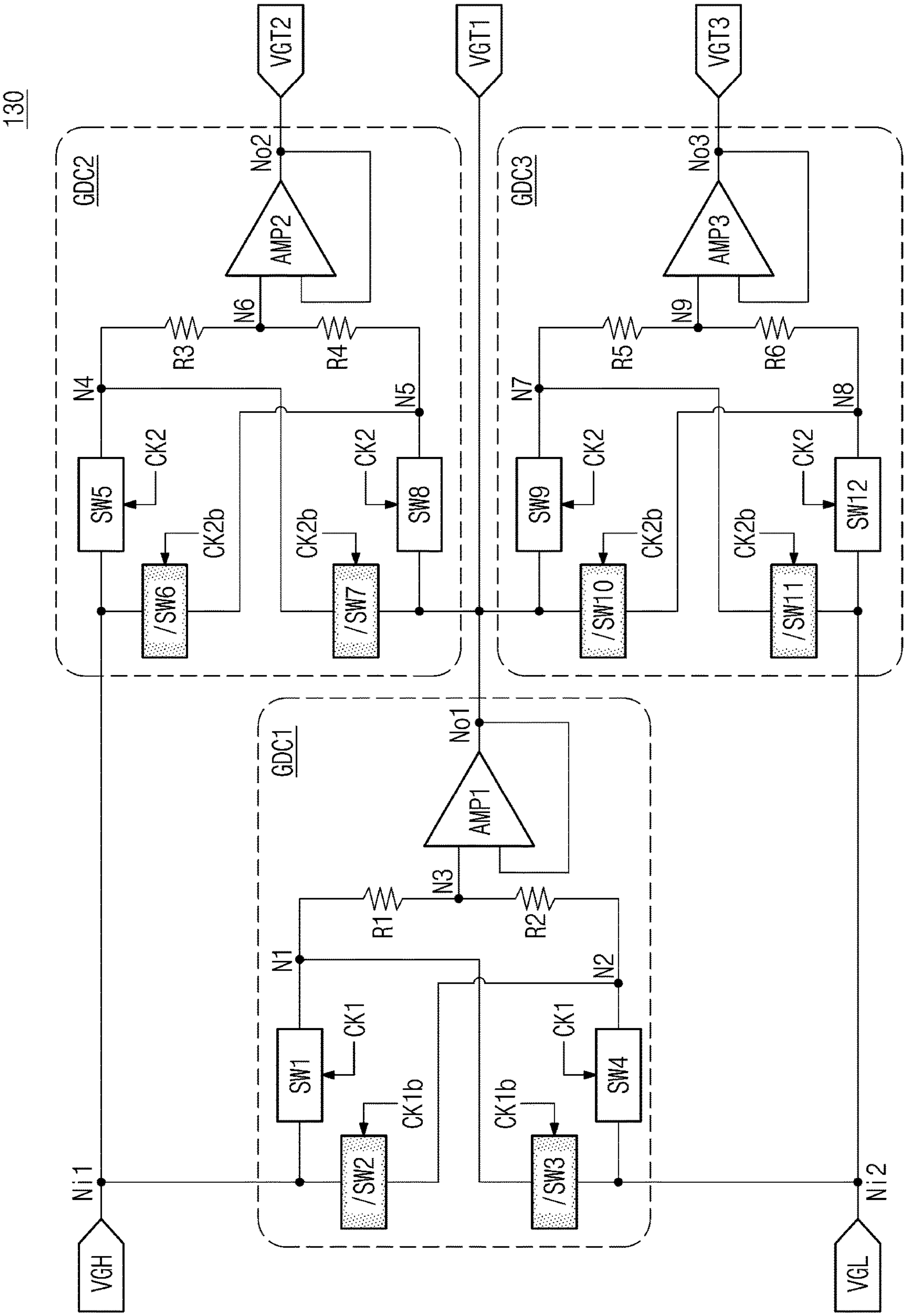
FIG. 4 is a diagram describing a gamma tap circuit of FIG. 3 according to some embodiments of the present disclosure.

FIG. 4 is a diagram describing a gamma tap circuit of FIG. 3 according to some embodiments of the present disclosure. Referring to FIGS. 3 and 4, the gamma tap circuit 130 may receive the clock signals CK1, CK1*b*, CK2, and CK2*b*. The gamma tap circuit 130 may receive the upper gamma tap voltage VGH through a first input node Ni1. The gamma tap circuit 130 may receive the lower gamma tap voltage VGL through a second input node Ni2. The gamma tap circuit 130 may output the first gamma tap voltage VGT1 through a first output node No1. The gamma tap circuit 130 may output the second gamma tap voltage VGT2 through a second output node No2. The gamma tap circuit 130 may output the third gamma tap voltage VGT3 through a third output node No3. The gamma tap circuit 130 may include the first gamma division circuit GDC1, the second gamma division circuit GDC2, and the third gamma division circuit GDC3.

Below, a slash (/) symbol is used in reference numerals of switches. A switch that does not use the slash (/) symbol may operate in response to a clock signal. The switch that uses the slash (/) symbol may operate in response to a complementary clock signal. The first gamma division circuit GDC1 may include a first switch SW1, a second switch /SW2, a third switch /SW3, a fourth switch SW4, a first resistor R1, a second resistor R2, and a first amplifier AMP1. The first switch SW1 may be connected between the first input node Ni1 of receiving the upper gamma tap voltage VGH and a first node N1. The first switch SW1 may operate in response to (i.e., be synchronized with) the first clock signal CK1. For example, when the voltage level of the first clock signal CK1 corresponds to the logic high state, the first switch SW1 may be turned on. When the first switch SW1 is turned on, the first input node Ni1 and the first node N1 being opposite ends of the first switch SW1 may be short-circuited. As another example, when the voltage level of the first clock signal CK1 corresponds to the logic low state, the first switch SW1 may be turned off. When the first switch SW1 is turned off, the first input node Ni1 and the first node N1 being the opposite ends of the first switch SW1 may be open.

The second switch /SW2 may be connected between the first input node Ni1 of receiving the upper gamma tap voltage VGH and a second node N2. The second switch /SW2 may operate in response to the first complementary clock signal CK1*b*. The third switch /SW3 may be connected between the second input node Ni2 of receiving the lower gamma tap voltage VGL and the first node N1. The third switch /SW3 may operate in response to the first complementary clock signal CK1*b*. The fourth switch SW4 may be connected between the second input node Ni2 of receiving the lower gamma tap voltage VGL and the second node N2. The fourth switch SW4 may operate in response to the first clock signal CK1.

The first resistor R1 may be electrically connected between the first node N1 and a third node N3. The second resistor R2 may be connected between the second node N2 and the third node n3. In some embodiments, a resistance value of the first resistor R1 may be identical to a resistance value of the second resistor R2.

The first amplifier AMP1 may generate the first gamma tap voltage VGT1 by amplifying a voltage of the third node N3. The first amplifier AMP1 may output the first gamma tap voltage VGT1 to the first output node Not. In some embodiments, the first amplifier AMP1 may be implemented with an operational amplifier. For example, the first amplifier AMP1 may include a non-inverting input terminal connected with the third node N3, an inverting input terminal connected with the first output node Not, and an output terminal connected with the first output node Not.

The second gamma division circuit GDC2 may include a fifth switch SW5, a sixth switch /SW6, a seventh switch /SW7, an eighth switch SW8, a third resistor R3, a fourth resistor R4, and a second amplifier AMP2. The fifth switch SW5 may be connected between the first input node Ni1 of receiving the upper gamma tap voltage VGH and a fourth node N4. The fifth switch SW5 may operate in response to the second clock signal CK2. The sixth switch /SW6 may be connected between the first input node Ni1 of receiving the upper gamma tap voltage VGH and a fifth node N5. The sixth switch /SW6 may operate in response to the second complementary clock signal CK2*b*. The seventh switch /SW7 may be connected between the first output node No1 at which the first gamma tap voltage VGT1 is generated and the fourth node N4. The seventh switch /SW7 may operate in response to the second complementary clock signal CK2*b*. The eighth switch SW8 may be connected between the first output node No1 at which the first gamma tap voltage VGT1 is generated and the fifth node N5. The eighth switch SW8 may operate in response to the second clock signal CK2.

The third resistor R3 may be connected between the fourth node N4 and a sixth node N6. The fourth resistor R4 may be connected between the fifth node N5 and the sixth node N6. In some embodiments, a resistance value of the third resistor R3 may be identical to a resistance value of the fourth resistor R4.

The second amplifier AMP2 may generate the second gamma tap voltage VGT2 by amplifying a voltage of the sixth node N6. The second amplifier AMP2 may output the second gamma tap voltage VGT2 to the second output node No2. In some embodiments, the second amplifier AMP2 may be implemented with an operational amplifier. For example, the second amplifier AMP2 may include a non-inverting input terminal connected with the sixth node N6, an inverting input terminal connected with the second output node No2, and an output terminal connected with the second output node No2.

The third gamma division circuit GDC3 may include a ninth switch SW9, a tenth switch /SW10, an eleventh switch /SW11, a twelfth switch SW12, a fifth resistor R5, a sixth resistor R6, and a third amplifier AMP3. The ninth switch SW9 may be connected between the first output node No1 at which the first gamma tap voltage VGT1 is generated and a seventh node N7. The ninth switch SW9 may operate in response to the second clock signal CK2. The tenth switch/SW10 may be connected between the first output node No1 at which the first gamma tap voltage VGT1 is generated and an eighth node N8. The tenth switch /SW10 may operate in response to the second complementary clock signal CK2*b*. The eleventh switch /SW11 may be connected between the second input node Ni2 of receiving the lower gamma tap voltage VGL and the seventh node N7. The eleventh switch /SW11 may operate in response to the second complementary clock signal CK2*b*. The twelfth switch SW12 may be connected between the second input node Ni2 of receiving the lower gamma tap voltage VGL and the eighth node N8. The twelfth switch SW12 may operate in response to the second clock signal CK2.

The fifth resistor R5 may be connected between the seventh node N7 and a ninth node N9. The sixth resistor R6 may be connected between the eighth node N8 and the ninth node N9. In some embodiments, a resistance value of the fifth resistor R5 may be identical to a resistance value of the sixth resistor R6.

The third amplifier AMP3 may generate the third gamma tap voltage VGT3 by amplifying a voltage of the ninth node N9. The third amplifier AMP3 may output the third gamma tap voltage VGT3 to the third output node No3. In some embodiments, the third amplifier AMP3 may be implemented with an operational amplifier. For example, the third amplifier AMP3 may include a non-inverting input terminal connected with the ninth node N9, an inverting input terminal connected with the third output node No3, and an output terminal connected with the third output node No3.

The circuit structures of the first gamma division circuit GDC1, the second gamma division circuit GDC2, and the third gamma division circuit GDC3 are described above. Because each of the first, second, and third gamma division circuits GDC1, GDC2, and GDC3 generates a gamma tap voltage by the voltage division of a pair of resistors chop with the same resistance value, the resistors may be implemented while minimizing the influence on the size of the gamma tap circuit 130. The gamma tap circuit 130 may have a small geometric layout size. In other words, the first, second, and third gamma division circuits GDC1, GDC2, and GDC3 may be similar in circuit structure and may be implemented simply. As such, the complexity of circuit of the gamma tap circuit 130 may decrease.

Also, each of the first, second, and third gamma division circuits GDC1, GDC2, and GDC3 may operate based on a pair of clock signals being complementary to each other, and may include symmetric elements (e.g., switches and resistors). As such, a resistance effect caused when switches are turned on and an amplitude variation with offset (AVO) corresponding an offset voltage may decrease. The AVO will be described in detail with reference to FIG. 12.

Figure 5:
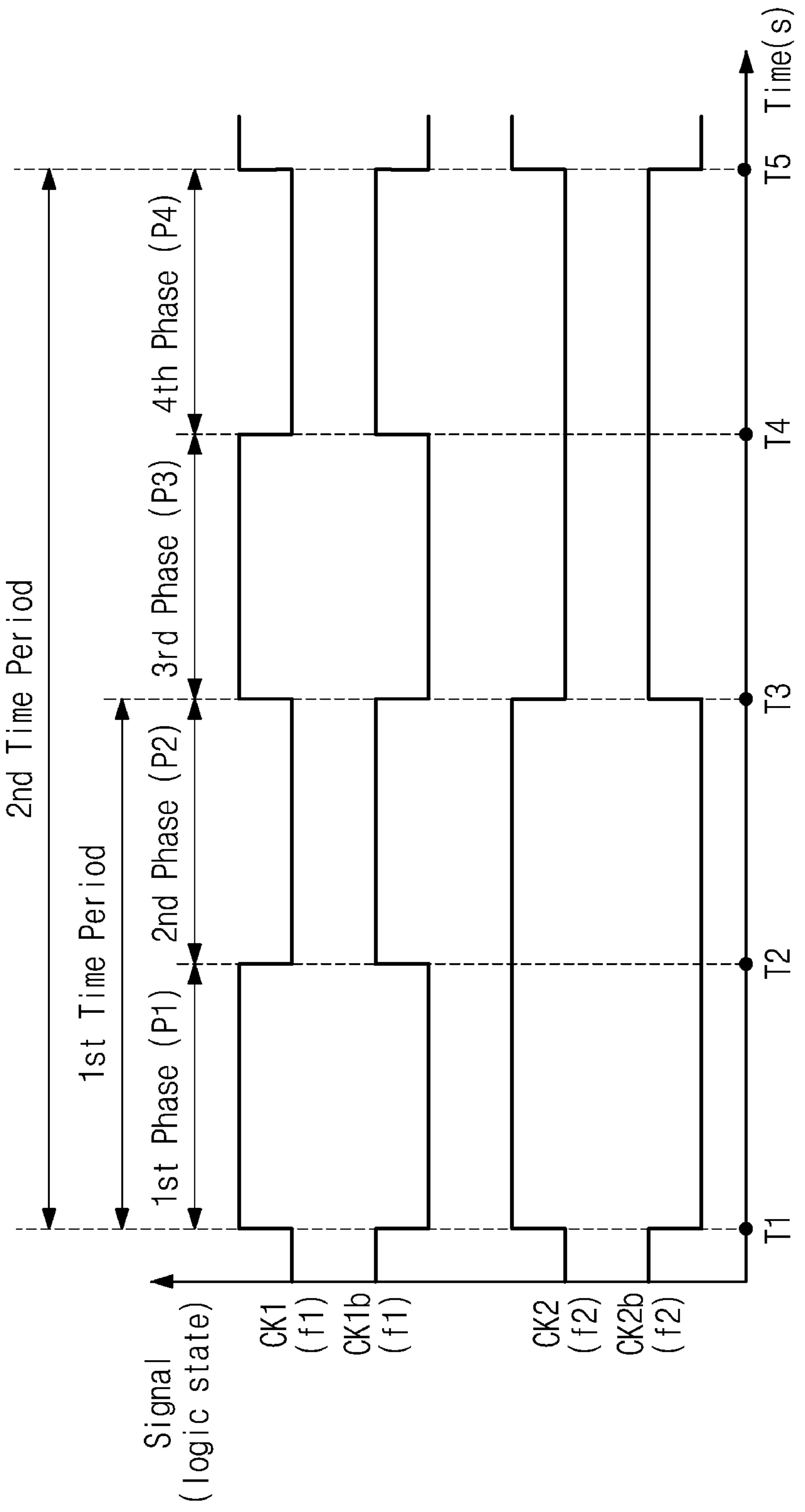
FIG. 5 is a graph describing clock signals of FIG. 3 according to some embodiments of the present disclosure.

FIG. 5 is a graph describing clock signals of FIG. 3 according to some embodiments of the present disclosure. Waveforms of the first clock signal CK1, the first complementary clock signal CK1*b*, the second clock signal CK2, and the second complementary clock signal CK2*b* over time will be described with reference to FIGS. 3 and 5. In FIG. 5, a horizontal axis represents a time, and a vertical axis represents a logic state of a clock signal. The logic state may refer to the logic high state or the logic low state.

Referring to the waveform of the first clock signal CK1, the first clock signal CK1 may be a signal that toggles at a period of a first frequency f1. The first frequency f1 may correspond to a first time period. The first time period may be a time period from the first point in time T1 to the third point in time T3. Referring to the waveform of the first complementary clock signal CK1*b*, the first complementary clock signal CK1*b* may be complementary to the first clock signal CK1. For example, while the first clock signal CK1 has the logic high state, the first complementary clock signal CK1*b* may have the logic low state. While the first clock signal CK1 has the logic low state, the first complementary clock signal CK1*b* may have the logic high state. Referring to the waveform of the second clock signal CK2, the second clock signal CK2 may be a signal that toggles at a period of a second frequency f2. The second frequency f2 may correspond to a second time period. The second time period may be a time period from the first point in time T1 to the fifth point in time T5. The first frequency f1 may be greater than the second frequency f2. For example, the first frequency f1 may be two times the second frequency f2. Referring to the waveform of the second complementary clock signal CK2*b*, the second complementary clock signal CK2*b* may be complementary to the second clock signal CK2. For example, while the second clock signal CK2 has the logic high state, the second complementary clock signal CK2*b* may have the logic low state. While the second clock signal CK2 has the logic low state, the second complementary clock signal CK2*b* may have the logic high state.

In some embodiments, the first clock signal CK1, the first complementary clock signal CK1*b*, the second clock signal CK2, and the second complementary clock signal CK2*b* may be repeated in a first phase P1, a second phase P2, a third phase P3, and a fourth phase P4 that are sequential in time. Thus, the first phase P1 may range from the first point in time T1 to the second point in time T2. During the first phase P1, the first clock signal CK1 may have the logic high state. The first complementary clock signal CK1*b* may have the logic low state. The second clock signal CK2 may have the logic high state. The second complementary clock signal CK2*b* may have the logic low state.

The second phase P2 may range from the second point in time T2 to the third point in time T3. During the second phase P2, the first clock signal CK1 may have the logic low state. The first complementary clock signal CK1*b* may have the logic high state. The second clock signal CK2 may have the logic high state. The second complementary clock signal CK2*b* may have the logic low state. The third phase P3 may range from the third point in time T3 to the fourth point in time T4. During the third phase P3, the first clock signal CK1 may have the logic high state. The first complementary clock signal CK1*b* may have the logic low state. The second clock signal CK2 may have the logic low state. The second complementary clock signal CK2*b* may have the logic high state. The fourth phase P4 may range from the fourth point in time T4 to the fifth point in time T5. During the fourth phase P4, the first clock signal CK1 may have the logic low state. The first complementary clock signal CK1*b* may have the logic high state. The second clock signal CK2 may have the logic low state. The second complementary clock signal CK2*b* may have the logic high state. In some embodiments, after the fifth point in time T5, the first to fourth phases P1, P2, P3, and P4 may be further sequentially repeated.

In some embodiments, lengths of time periods respectively corresponding to the first phase P1, the second phase P2, the third phase P3, and the fourth phase P4 may be identical to each other. For example, during one period, a time length in which the first clock signal CK1 maintains the logic high state may be identical to a time length in which the first clock signal CK1 maintains the logic low state. Likewise, during one period, a time length in which each of the first complementary clock signal CK1*b*, the second clock signal CK2, and the second complementary clock signal CK2*b* maintains the logic high state may be identical to a time length in which each of the first complementary clock signal CK1*b*, the second clock signal CK2, and the second complementary clock signal CK2*b* maintains the logic low state.

Figure 6A:
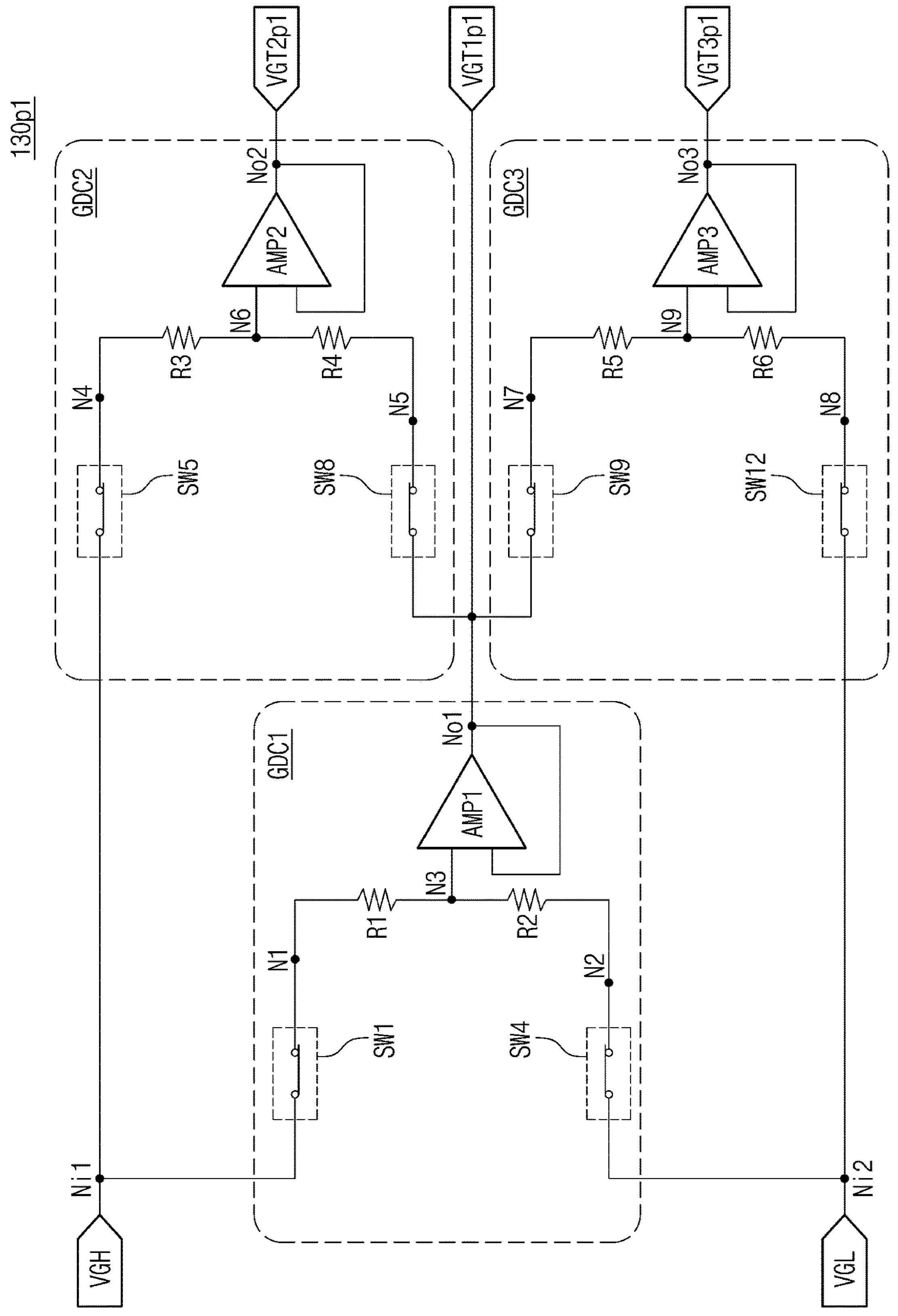
FIGS. 6A to 6D are circuit diagrams describing a gamma tap circuit in phases of FIG. 5, according to some embodiments of the present disclosure.

FIGS. 6A to 6D are circuit diagrams describing a gamma tap circuit in phases of FIG. 5, according to some embodiments of the present disclosure. FIG. 6A is a circuit diagram describing a gamma tap circuit 130*p*1 corresponding to the first phase P1 of FIG. 5. A circuit structure of the gamma tap circuit 130*p*1 may be similar to the circuit structure of the gamma tap circuit 130 of FIG. 4.

Referring to FIGS. 4, 5, and 6A, the first switch SW1, the fourth switch SW4, the fifth switch SW5, the eighth switch SW8, the ninth switch SW9, and the twelfth switch SW12 may be turned on. The second switch /SW2, the third switch /SW3, the sixth switch /SW6, the seventh switch /SW7, the tenth switch /SW10, and the eleventh switch /SW11 may be turned off. For better understanding of the present disclosure, the turned-off switches are omitted in FIG. 6A.

In the first phase P1, the voltage level of the first gamma tap voltage VGT1 may be expressed by the following equation: VGT1*p*1=VGL+(VGH−VGL)*R2/(R1+R2). Herein, VGT1*p*1 represents a first gamma tap voltage of a first phase, VGH represents an upper gamma tap voltage, VGL represents a lower gamma tap voltage, R1 represents a first resistance value, and R2 represents a second resistance value. In the first phase P1, the voltage level of the second gamma tap voltage VGT2 may be expressed by the following equation: VGT2*p*1=VGT1*p*1+(VGH−VGT1*p*1)*R4/(R3+R4). Herein, VGT2*p*1 represents a second gamma tap voltage of a first phase, VGH represents an upper gamma tap voltage, VGT1*p*1 represents a first gamma tap voltage of a first phase, R3 represents a third resistance value, and R4 represents a fourth resistance value. In the first phase P1, the voltage level of the third gamma tap voltage VGT3 may be expressed by the following equation: VGT3*p*1=VGL+(VGT1*p*1−VGL)*R6/(R5+R6). Herein, VGT3*p*1 represents a third gamma tap voltage of a first phase, VGL represents of a lower gamma tap voltage, VGT1*p*1 represents a first gamma tap voltage of a first phase, R5 represents a fifth resistance value, and R6 represents a sixth resistance value.

Figure 6B:
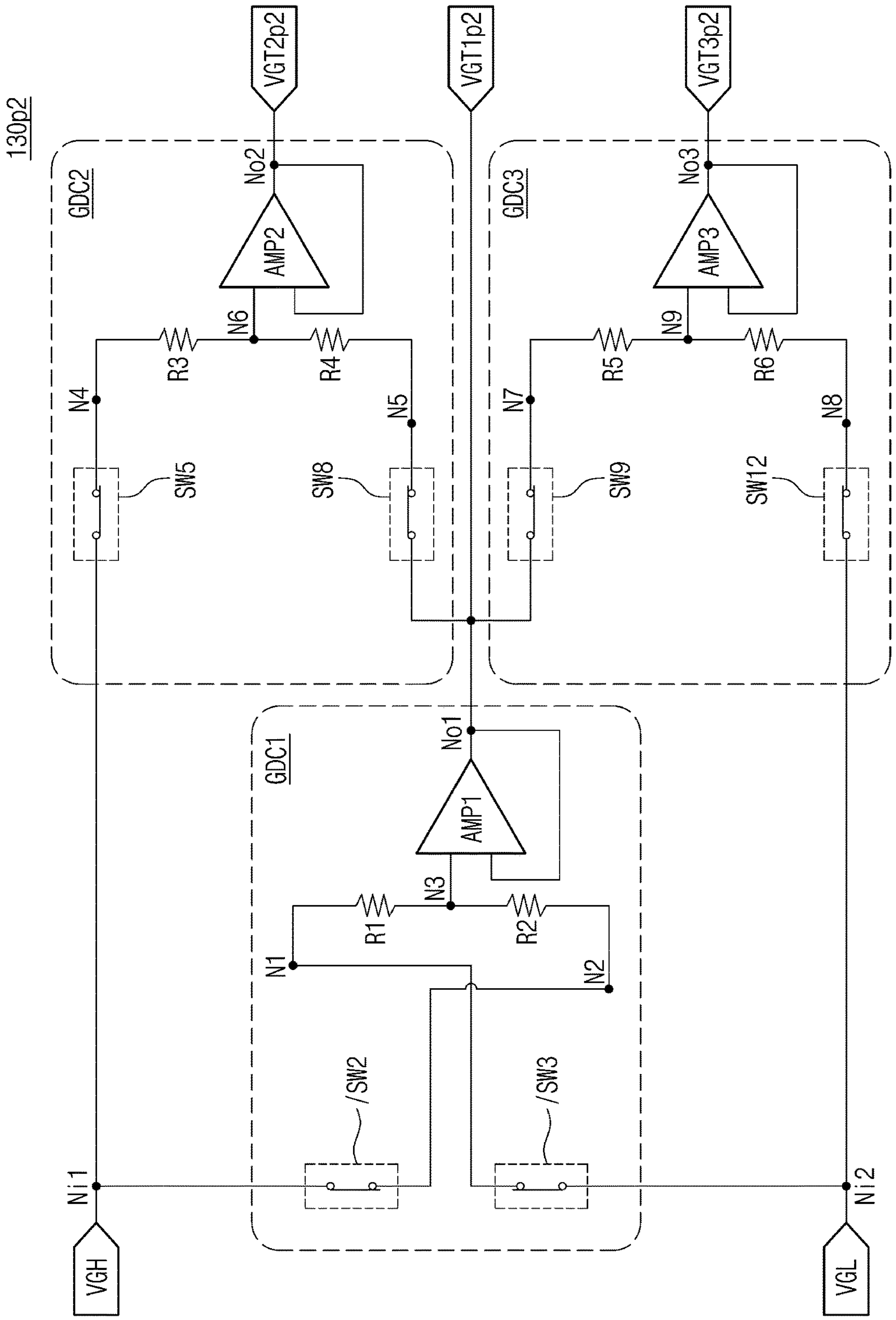

FIG. 6B is a circuit diagram describing a gamma tap circuit 130*p*2 corresponding to the second phase P2 of FIG. 5. A circuit structure of the gamma tap circuit 130*p*2 may be similar to the circuit structure of the gamma tap circuit 130 of FIG. 4. Referring to FIGS. 4, 5, and 6B, the second switch /SW2, the third switch /SW3, the fifth switch SW5, the eighth switch SW8, the ninth switch SW9, and the twelfth switch SW12 may be turned on. The first switch SW1, the fourth switch SW4, the sixth switch /SW6, the seventh switch /SW7, the tenth switch /SW10, and the eleventh switch /SW11 may be turned off. For better understanding of the present disclosure, the turned-off switches are omitted in FIG. 6B.

In the second phase P2, the voltage level of the first gamma tap voltage VGT1p2 may be expressed by the following equation: $VGT1p2=VGL+(VGH-VGL)*R1/(R1+R2)$. Herein, VGT1p2 represents a first gamma tap voltage of a second phase, VGH represents an upper gamma tap voltage, VGL represents a lower gamma tap voltage, R1 represents a first resistance value, and R2 represents a second resistance value. In the second phase P2, the voltage level of the second gamma tap voltage VGT2p2 may be expressed by the following equation: $VGT2p2=VGT1p2+(VGH-VGT1p2)*R4/(R3+R4)$. Herein, VGT2p2 represents a second gamma tap voltage of a second phase, VGH represents an upper gamma tap voltage, VGT1p2 represents a first gamma tap voltage of a second phase, R3 represents a third resistance value, and R4 represents a fourth resistance value. In the second phase P2, the voltage level of the third gamma tap voltage VGT3p2 may be expressed by the following equation: $VGT3p2=VGL+(VGT1p2-VGL)*R6/(R5+R6)$. Herein, VGT3p2 represents a third gamma tap voltage of a second phase, VGL represents of a lower gamma tap voltage, VGT1p2 represents a first gamma tap voltage of a second phase, R5 represents a fifth resistance value, and R6 represents a sixth resistance value.

Figure 6C:
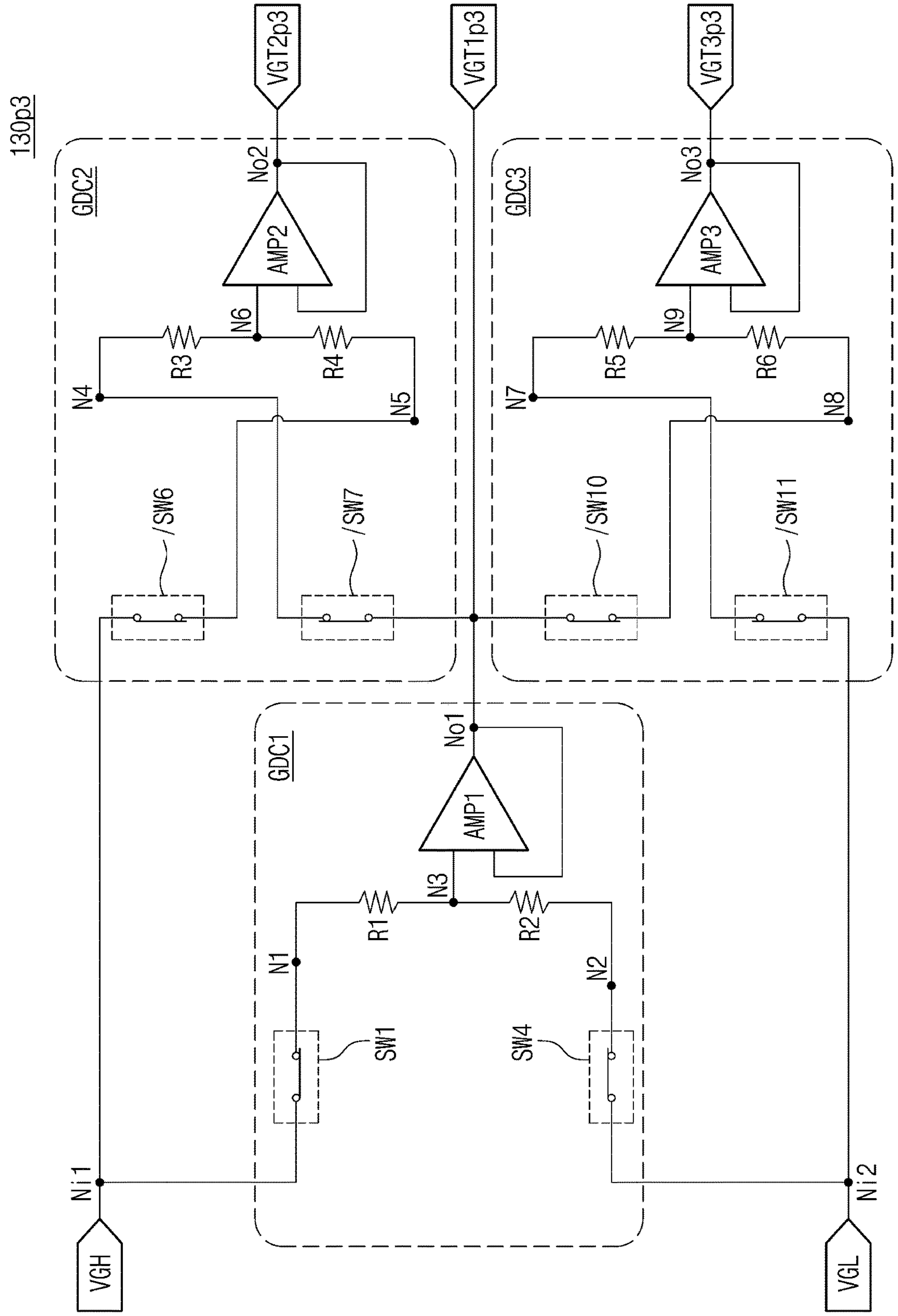

FIG. 6C is a circuit diagram describing a gamma tap circuit 130p3 corresponding to the third phase P3 of FIG. 5. A circuit structure of the gamma tap circuit 130p3 may be similar to the circuit structure of the gamma tap circuit 130 of FIG. 4. Referring to FIGS. 4, 5, and 6C, the first switch SW1, the fourth switch SW4, the sixth switch /SW6, the seventh switch /SW7, the tenth switch /SW10, and the eleventh switch /SW11 may be turned on. The second switch /SW2, the third switch /SW3, the fifth switch SW5, the eighth switch SW8, the ninth switch SW9, and the twelfth switch SW12 may be turned off. For better understanding of the present disclosure, the turned-off switches are omitted in FIG. 6C.

In the third phase P3, the voltage level of the first gamma tap voltage VGT1p3 may be expressed by the following equation: $VGT1p3=VGL+(VGH-VGL)*R2/(R1+R2)$. Herein, VGT1p3 represents a first gamma tap voltage of a third phase, VGH represents an upper gamma tap voltage, VGL represents a lower gamma tap voltage, R1 represents a first resistance value, and R2 represents a second resistance value. In the third phase P3, the voltage level of the second gamma tap voltage VGT2p3 may be expressed by the following equation: $VGT2p3=VGT1p3+(VGH-VGT1p3)*R3/(R3+R4)$. Herein, VGT2p3 represents a second gamma tap voltage of a third phase, VGH represents an upper gamma tap voltage, VGT1p3 represents a first gamma tap voltage of a third phase, R3 represents a third resistance value, and R4 represents a fourth resistance value. In the third phase P3, the voltage level of the third gamma tap voltage VGT3p3 may be expressed by the following equation: $VGT3p3=VGL+(VGT1p3-VGL)*R5/(R5+R6)$. Herein, VGT3p3 represents a third gamma tap voltage of a third phase, VGL represents of a lower gamma tap voltage, VGT1p3 represents a first gamma tap voltage of a third phase, R5 represents a fifth resistance value, and R6 represents a sixth resistance value.

Figure 6D:
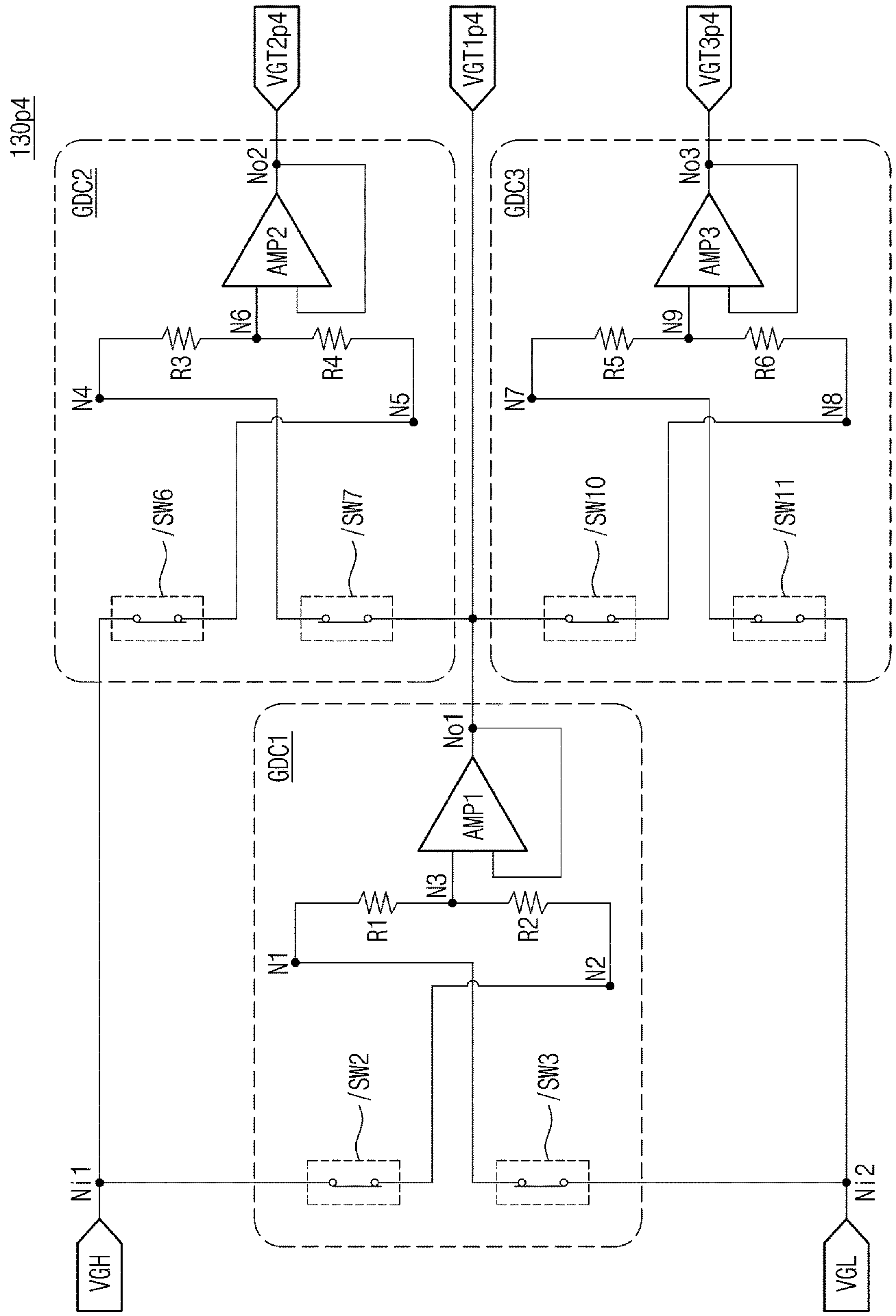

FIG. 6D is a circuit diagram describing a gamma tap circuit 130p4 corresponding to the fourth phase P4 of FIG. 5. A circuit structure of the gamma tap circuit 130p4 may be similar to the circuit structure of the gamma tap circuit 130 of FIG. 4. Referring to FIGS. 4, 5, and 6D, the second switch /SW2, the third switch /SW3, the sixth switch /SW6, the seventh switch /SW7, the tenth switch /SW10, and the eleventh switch /SW11 may be turned on. The first switch SW1, the fourth switch SW4, the fifth switch SW5, the eighth switch SW8, the ninth switch SW9, and the twelfth switch SW12 may be turned off. For better understanding of the present disclosure, the turned-off switches are omitted in FIG. 6D.

In the fourth phase P4, the voltage level of the first gamma tap voltage VGT1p4 may be expressed by the following equation: $VGT1p4=VGL+(VGH-VGL)*R1/(R1+R2)$. Herein, VGT1p4 represents a first gamma tap voltage of a fourth phase, VGH represents an upper gamma tap voltage, VGL represents a lower gamma tap voltage, R1 represents a first resistance value, and R2 represents a second resistance value. In the fourth phase P4, the voltage level of the second gamma tap voltage VGT2p4 may be expressed by the following equation: $VGT2p4=VGT1p4+(VGH-VGT1p4)*R3/(R3+R4)$. Herein, VGT2p4 represents a second gamma tap voltage of a fourth phase, VGH represents an upper gamma tap voltage, VGT1p4 represents a first gamma tap voltage of a fourth phase, R3 represents a third resistance value, and R4 represents a fourth resistance value. In the fourth phase P4, the voltage level of the third gamma tap voltage VGT3p4 may be expressed by the following equation: $VGT3p4=VGL+(VGT1p4-VGL)*R5/(R5+R6)$. Herein, VGT3p4 represents a third gamma tap voltage of a fourth phase, VGL represents of a lower gamma tap voltage, VGT1p4 represents a first gamma tap voltage of a fourth phase, R5 represents a fifth resistance value, and R6 represents a sixth resistance value.

Figure 7:
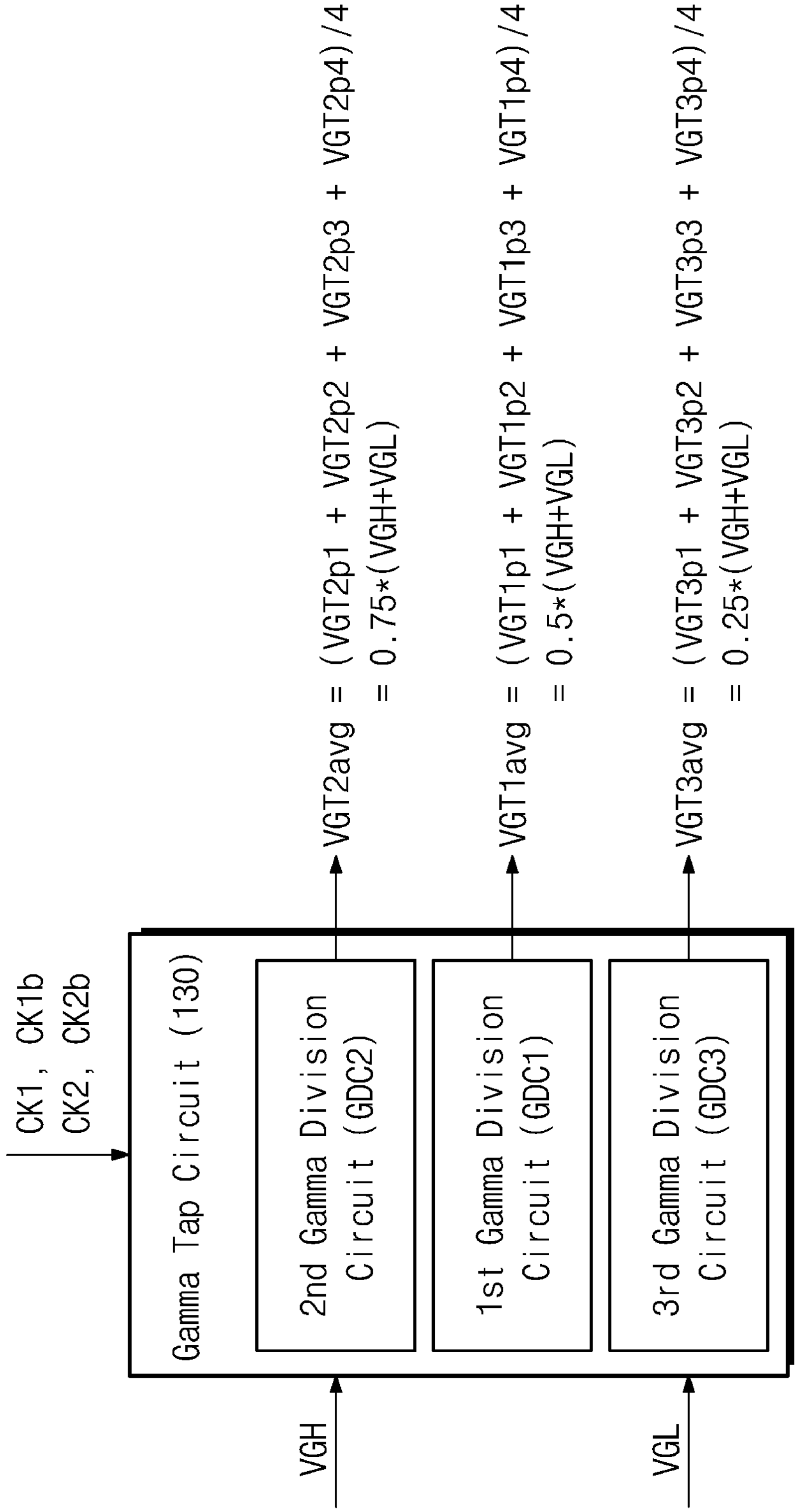
FIG. 7 is a diagram describing gamma tap voltages of a gamma tap circuit of FIG. 3 according to some embodiments of the present disclosure.

FIG. 7 is a diagram describing gamma tap voltages of a gamma tap circuit of FIG. 3 according to some embodiments of the present disclosure. Referring to FIG. 7, the gamma tap circuit 130 may include the first gamma division circuit GDC1, the second gamma division circuit GDC2, and the third gamma division circuit GDC3. The first gamma division circuit GDC1 may generate a first average gamma tap voltage VGT1avg by the voltage division of the upper gamma tap voltage VGH and the lower gamma tap voltage VGL, in response to the first clock signal CK1 and the first complementary clock signal CK1b, during one period. One period may correspond to a time period including the first to fourth phases P1, P2, P3, and P4 sequential in FIG. 5. The first average gamma tap voltage VGT1avg may be an average of first gamma tap voltages during one period.

The voltage level of the first average gamma tap voltage VGT1avg may be expressed by the following equation: $VGT1avg=(VGT1p1+VGT1p2+VGT1p3+VGT1p4)/4$. Herein, VGT1avg represents an average of first gamma tap voltages during one period, VGT1p1 represents a first gamma tap voltage of a first phase, VGT1p2 represents a first gamma tap voltage of a second phase, VGT1p3 represents a first gamma tap voltage of a third phase, and VGT1p4 represents a first gamma tap voltage of a fourth phase. By applying equations of VGT1p1, VGT1p2, VGT1p3, and VGT1p4 to an equation of the first average gamma tap voltage VGT1avg, the first average gamma tap voltage VGT1avg may be summarized as follow: $VGT1avg=0.5*(VGH+VGL)$.

The second gamma division circuit GDC2 may generate a second average gamma tap voltage VGT2avg by the voltage division of the upper gamma tap voltage VGH and the first average gamma tap voltage VGT1avg, in response to the second clock signal CK2 and the second complementary clock signal CK2b, during one period. One period may correspond to a time period including the first to fourth phases P1, P2, P3, and P4 sequential in FIG. 5. The second average gamma tap voltage VGT2*avg* may be an average of second gamma tap voltages during one period.

The voltage level of the second average gamma tap voltage VGT2*avg* may be expressed by the following equation: VGT2*avg*=(VGT2*p*1+VGT2*p*2+VGT2*p*3+VGT2*p*4)/4. Herein, VGT2*avg* represents an average of second gamma tap voltages during one period, VGT2*p*1 represents a second gamma tap voltage of a first phase, VGT2*p*2 represents a second gamma tap voltage of a second phase, VGT2*p*3 represents a second gamma tap voltage of a third phase, and VGT2*p*4 represents a second gamma tap voltage of a fourth phase. By applying equations of VGT2*p*1, VGT2*p*2, VGT2*p*3, and VGT2*p*4 to an equation of the second average gamma tap voltage VGT2*avg*, the second average gamma tap voltage VGT2*avg* may be summarized as follow: VGT2*avg*=0.75*(VGH+VGL).

The third gamma division circuit GDC3 may generate a third average gamma tap voltage VGT3*avg* by the voltage division of the first average gamma tap voltage VGT1*avg* and the lower gamma tap voltage VGL, in response to the second clock signal CK2 and the second complementary clock signal CK2*b*, during one period. One period may correspond to a time period including the first to fourth phases P1, P2, P3, and P4 sequential in FIG. 5 (i.e., a time period from the first point in time T1 to the fifth point in time T5). The third average gamma tap voltage VGT3*avg* may be an average of third gamma tap voltages during one period.

The voltage level of the third average gamma tap voltage VGT3*avg* may be expressed by the following equation: VGT3*avg*=(VGT3*p*1+VGT3*p*2+VGT3*p*3+VGT3*p*4)/4. Herein, VGT3*avg* represents an average of third gamma tap voltages during one period, VGT3*p*1 represents a third gamma tap voltage of a first phase, VGT3*p*2 represents a third gamma tap voltage of a second phase, VGT3*p*3 represents a third gamma tap voltage of a third phase, and VGT3*p*4 represents a third gamma tap voltage of a fourth phase. By applying equations of VGT3*p*1, VGT3*p*2, VGT3*p*3, and VGT3*p*4 to an equation of the third average gamma tap voltage VGT3*avg*, the third average gamma tap voltage VGT3*avg* may be summarized as follow: VGT3*avg*=0.25*(VGH+VGL).

Figure 8:
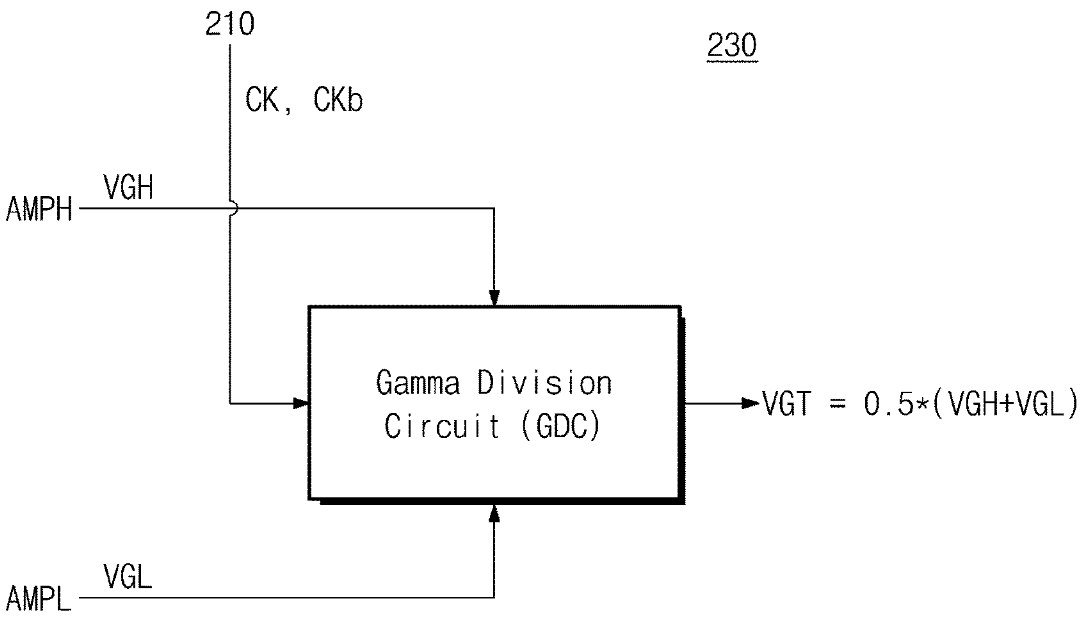
FIG. 8 is a diagram describing a gamma tap circuit according to some embodiments of the present disclosure.

FIG. 8 is a diagram describing a gamma tap circuit according to some embodiments of the present disclosure. Referring to FIG. 8, a gamma tap circuit 230 may receive the upper gamma tap voltage VGH from the upper amplifier AMPH, may receive the lower gamma tap voltage VGL from the lower amplifier AMPL, and may receive clock signals CK and CKb from an adjustment circuit 210. The upper amplifier AMPH, the lower amplifier AMPL, and the adjustment circuit 210 may respectively correspond to the upper amplifier AMPH, the lower amplifier AMPL, and the adjustment circuit 110 of FIG. 2.

The gamma tap circuit 230 may be a single gamma tap circuit that generates a gamma tap voltage VGT. The single gamma tap circuit may generate one gamma tap voltage based on the upper gamma tap voltage VGH and the lower gamma tap voltage VGL. The gamma tap circuit 230 may include a gamma division circuit GDC. The gamma division circuit GDC may receive the clock signal CK and the complementary clock signal CKb from the adjustment circuit 210. The gamma division circuit GDC may generate the gamma tap voltage VGT by voltage division of the upper gamma tap voltage VGH and the lower gamma tap voltage VGL, in response to the clock signal CK and the complementary clock signal CKb.

For example, the voltage level of the gamma tap voltage VGT may be half the sum of the voltage level of the upper gamma tap voltage VGH and the voltage level and the lower gamma tap voltage VGL. The voltage level of the gamma tap voltage VGT may be expressed by using the upper gamma tap voltage VGH and the lower gamma tap voltage VGL as follow: VGT=0.5*(VGH+VGL). Herein, VGT represents a gamma tap voltage, VGH represents an upper gamma tap voltage, and VGL represents a lower gamma tap voltage. The gamma division circuit GDC may provide the gamma tap voltage VGT to a gamma resistor string. The gamma resistor string may generate a plurality of gamma voltages based on the upper gamma tap voltage VGH, the lower gamma tap voltage VGL, and the gamma tap voltage VGT.

Figure 9:
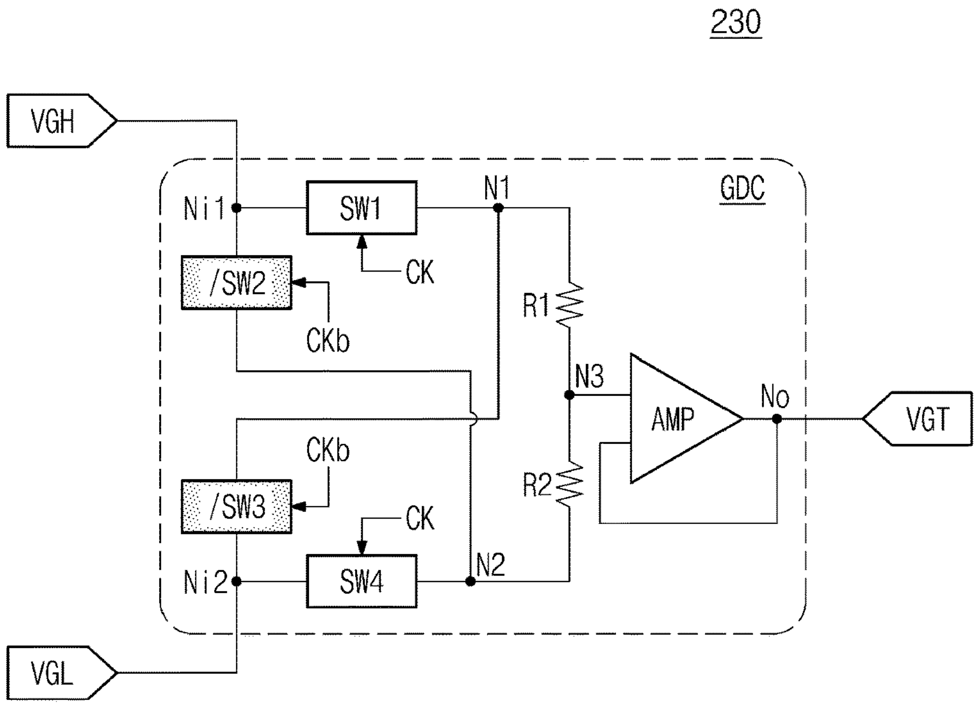
FIG. 9 is a diagram describing a gamma tap circuit of FIG. 8 according to some embodiments of the present disclosure.

FIG. 9 is a diagram describing a gamma tap circuit of FIG. 8 according to some embodiments of the present disclosure. Referring to FIGS. 8 and 9, the gamma tap circuit 230 may receive the clock signals CK and CKb. The gamma tap circuit 230 may receive the upper gamma tap voltage VGH through a first input node Ni1. The gamma tap circuit 230 may receive the lower gamma tap voltage VGL through a second input node Ni2. The gamma tap circuit 230 may output the gamma tap voltage VGT through an output node No.

The gamma tap circuit 230 may include the gamma division circuit GDC. The gamma division circuit GDC may include a first switch SW1, a second switch /SW2, a third switch /SW3, a fourth switch SW4, a first resistor R1, a second resistor R2, and an amplifier AMP. The first switch SW1 may be connected between the first input node Ni1 of receiving the upper gamma tap voltage VGH and a first node N1. The first switch SW1 may operate in response to the clock signal CK. The second switch /SW2 may be connected between the first input node Ni1 of receiving the upper gamma tap voltage VGH and a second node N2. The second switch /SW2 may operate in response to the complementary clock signal CKb. The third switch/SW3 may be connected between the second input node Ni2 of receiving the lower gamma tap voltage VGL and the first node N1. The third switch /SW3 may operate in response to the complementary clock signal CKb. The fourth switch SW4 may be connected between the second input node Ni2 of receiving the lower gamma tap voltage VGL and the second node N2. The fourth switch SW4 may operate in response to the clock signal CK.

The first resistor R1 may be connected between the first node N1 and a third node N3. The second resistor R2 may be connected between the second node N2 and the third node n3.

The amplifier AMP may generate the gamma tap voltage VGT by amplifying a voltage of the third node N3. The amplifier AMP may output the gamma tap voltage VGT to the output node. In some embodiments, the amplifier AMP may be implemented with an operational amplifier. For example, the amplifier AMP may include a non-inverting input terminal connected with the third node N3, an inverting input terminal connected with the output node No, and an output terminal connected with the output node No.

Figure 10:
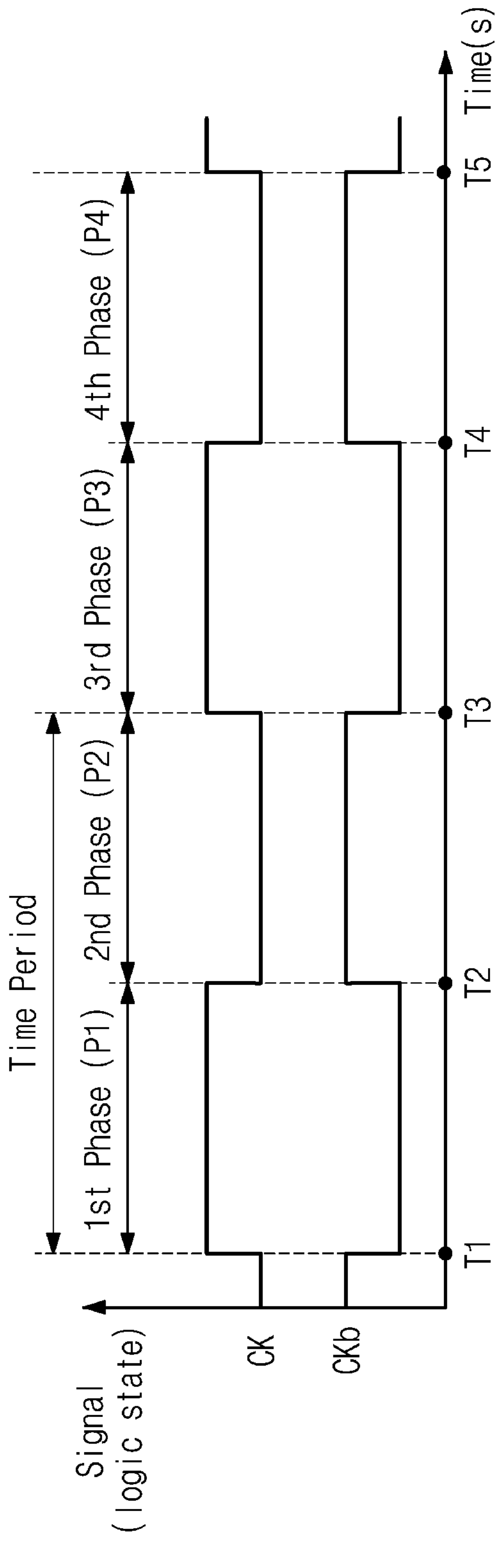
FIG. 10 is a graph describing clock signals of FIG. 8 according to some embodiments of the present disclosure.

FIG. 10 is a graph describing clock signals of FIG. 8 according to some embodiments of the present disclosure. Waveforms of the clock signal CK and the complementary clock signal CKb over time will be described with reference to FIGS. 8 and 10. In FIG. 10, a horizontal axis represents a time, and a vertical axis represents a logic state of a clock signal.

Referring to the waveform of the clock signal CK, the clock signal CK may be a signal that toggles periodically. A period of the clock signal CK may correspond to a time period from the first point in time T1 to the third point in time T3. Referring to the waveform of the complementary clock signal CKb, the complementary clock signal CKb may be complementary to the clock signal CK. For example, while the clock signal CK has the logic high state, the complementary clock signal CKb may have the logic low state. While the clock signal CK has the logic low state, the complementary clock signal CKb may have the logic high state.

In some embodiments, the clock signal CK and the complementary clock signal CKb may be repeated in a first phase P1 and a second phase P2 that are sequential. For example, as in the first phase P1 and the second phase P2, the clock signal CK and the complementary clock signal CKb may further toggle in a third phase P3 and a fourth phase P4. The first phase P1 may range from the first point in time T1 to the second point in time T2. The second phase P2 may range from the second point in time T2 to the third point in time T3. The third phase P3 may range from the third point in time T3 to the fourth point in time T4. The fourth phase P4 may range from the fourth point in time T4 to the fifth point in time T5.

In some embodiments, lengths of time periods respectively corresponding to the first phase P1 and the second phase P2 may be identical to each other. For example, during one period, a time length in which the clock signal CK maintains the logic high state may be identical to a time length in which the clock signal CK maintains the logic low state. Likewise, during one period, a time length in which the complementary clock signal CKb maintains the logic high state may be identical to a time length in which the complementary clock signal CKb maintains the logic low state.

Figure 11:
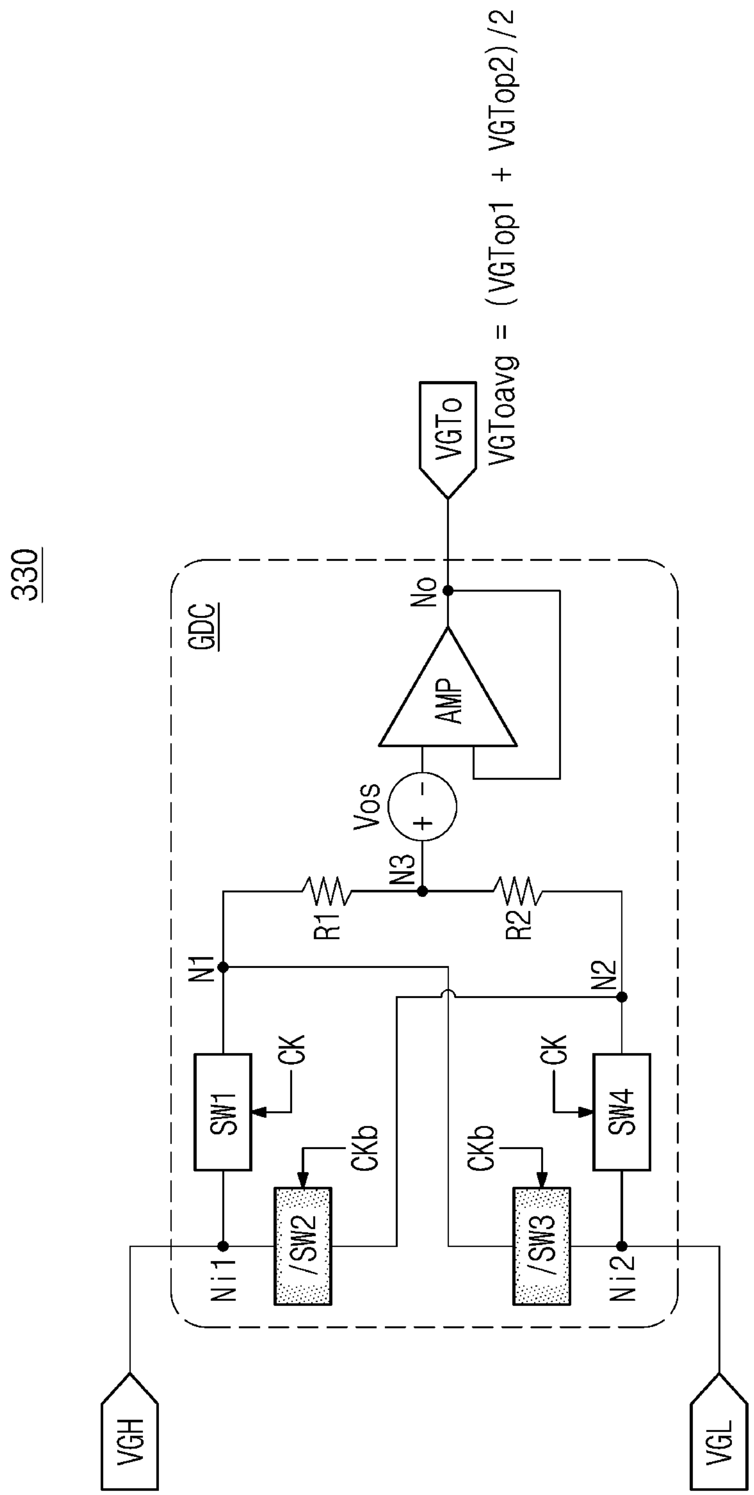
FIG. 11 is a circuit diagram describing an offset voltage of a gamma tap circuit according to some embodiments of the present disclosure.

FIG. 11 is a circuit diagram describing an offset voltage of a gamma tap circuit according to some embodiments of the present disclosure. Referring to FIG. 11, a gamma tap circuit 330 may receive the clock signals CK and CKb. The gamma tap circuit 330 may receive the upper gamma tap voltage VGH through the first input node Ni1. The gamma tap circuit 330 may receive the lower gamma tap voltage VGL through the second input node Ni2. The gamma tap circuit 330 may output the gamma tap voltage VGT through the output node No. The gamma tap circuit 330 may include the gamma division circuit GDC. The gamma division circuit GDC may include the first switch SW1, the second switch /SW2, the third switch /SW3, the fourth switch SW4, the first resistor R1, the second resistor R2, and the amplifier AMP.

The first switch SW1, the second switch /SW2, the third switch /SW3, the fourth switch SW4, the first resistor R1, the second resistor R2, and the amplifier AMP are similar to the first switch SW1, the second switch /SW2, the third switch /SW3, the fourth switch SW4, the first resistor R1, the second resistor R2, and the amplifier AMP of FIG. 9, and thus, additional description will be omitted to avoid redundancy. The gamma division circuit GDC of the gamma tap circuit 330 may have an offset voltage Vos. Because the offset voltage Vos causes the fluctuations of the voltage level of a gamma tap voltage VGTo, the offset voltage Vos may reduce the quality of an image displayed through the display panel 14 of FIG. 1. The offset voltage Vos may be modeled as a voltage source between the third node N3 and the amplifier AMP. The gamma tap circuit 330 may generate the gamma tap voltage VGTo to which the offset voltage Vos is applied.

According to embodiments of the present disclosure, the gamma tap circuit 330 may reduce a negative effect of the offset voltage Vos by alternately applying the upper gamma tap voltage VGH and the lower gamma tap voltage VGL by using the complementary clock signals CK and CKb. For example, during one period, an average of the gamma tap voltages VGTo generated by the gamma tap circuit 330 may be referred to as an "average gamma tap voltage VGToavg". One period may include a first phase and a second phase. The first phase may refer to a time period in which the clock signal CK has the logic high state. The second phase may refer to a time period in which the complementary clock signal CKb has the logic high state.

The voltage level of the average gamma tap voltage VGToavg may be expressed by the following equation: VGToavg=(VGTop1+VGTop2)/2. Herein, VGToavg represents an average of gamma tap voltages to which an offset voltage is applied during one period, VGTop1 represents a gamma tap voltage to which an offset voltage of a first phase is applied, and VGTop2 represents a gamma tap voltage to which an offset voltage of a second phase is applied.

In some embodiments, a component corresponding to the offset voltage Vos in the gamma tap voltage VGTo1 of the first phase and a component corresponding to the offset voltage Vos in the gamma tap voltage VGTo2 of the second phase may be canceled out. In detail, during the first phase, the voltage level of the gamma tap voltage VGTo1 may be greater than the sum of the voltage level of the upper gamma tap voltage VGH and the voltage level and the lower gamma tap voltage VGL as much as the offset voltage Vos of the amplifier AMP. During the second phase, the voltage level of the gamma tap voltage VGTop2 may be less than the sum of the voltage level of the upper gamma tap voltage VGH and the voltage level and the lower gamma tap voltage VGL as much as the offset voltage Vos of the amplifier AMP. As such, during one period of the clock signal CK corresponding to the sum of the first phase and the second phase, a negative effect due to the offset voltage Vos may decrease in the average gamma tap voltage VGToavg.

Figure 12:
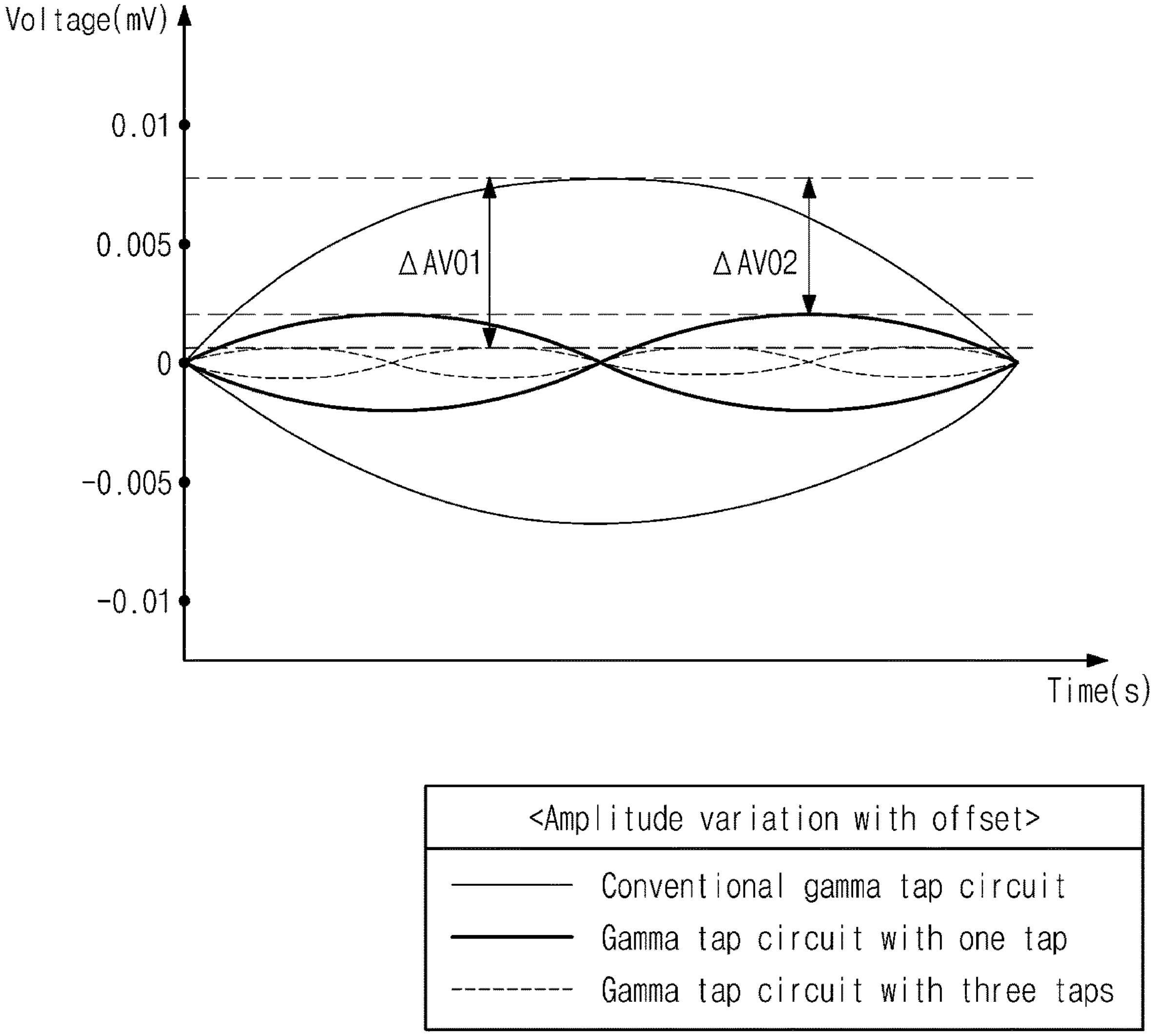
FIG. 12 is a graph describing an amplitude variation with offset (AVO) of gamma tap circuits according to some embodiments of the present disclosure.

FIG. 12 is a graph describing an AVO of gamma tap circuits according to some embodiments of the present disclosure. An AVO waveform of a conventional gamma tap circuit, an AVO waveform of a gamma tap circuit having one tap, and an AVO waveform of a gamma tap circuit having three taps will be described with reference to FIG. 12. In FIG. 12, a horizontal axis represents a time, and a vertical axis represents a magnitude of a voltage.

The AVO may indicate how much the voltage level of the gamma tap voltage varies depending on an offset voltage. For example, as the magnitude of the AVO becomes greater, a variation in the voltage level of the gamma tap voltage may become greater. The AVO waveform of the conventional gamma tap circuit is shown by a solid line. The conventional gamma tap circuit may be a conventional circuit to which aspects of the present disclosure are not applied. The AVO waveform of the gamma tap circuit with one tap is shown by a bold solid line. The gamma tap circuit with one tap may correspond to the gamma tap circuit 230 of FIG. 8. The AVO waveform of the gamma tap circuit with three taps is shown by a dashed line. The gamma tap circuit with three taps may correspond to the gamma tap circuit 130 of FIG. 4.

In some embodiments, the AVO of the gamma tap circuit with three taps may be smaller than the AVO of the conventional gamma tap circuit. For example, a difference between the maximum amplitude in the AVO waveform of the gamma tap circuit with three taps and the maximum amplitude in the AVO waveform of the conventional gamma tap circuit is referred to as a "first AVO difference ΔAVO1". In terms of the AVO, the gamma tap circuit with three taps may be about 93.2% better than the conventional gamma tap circuit.

In some embodiments, the AVO of the gamma tap circuit with one tap may be smaller than that of the conventional gamma tap circuit. For example, a difference between the maximum amplitude in the AVO waveform of the gamma tap circuit with one tap and the maximum amplitude in the AVO waveform of the conventional gamma tap circuit is referred to as a "second AVO difference ΔAVO2". In terms of the AVO, the gamma tap circuit with one tap may be about 74.8% better than the conventional gamma tap circuit.

According to an embodiment of the present disclosure, a gamma tap circuit generating a gamma tap voltage and a display device including the same are provided. Also, a gamma tap circuit capable of decreasing an amplitude variation with offset (AVO) and the complexity of circuit by using complementary clock signals and symmetric elements and a display device including the same are provided.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A gamma tap circuit, comprising:

a first gamma division circuit configured to generate a first gamma tap voltage by performing voltage division of an upper gamma tap voltage and a lower gamma tap voltage, in response to a first clock signal and a first complementary clock signal, said first gamma division circuit comprising:

a first switch electrically connected between a first input node, which receives the upper gamma tap voltage, and a first node, and responsive to the first clock signal;

a second switch electrically connected between the first input node and a second node, and responsive to the first complementary clock signal;

a third switch electrically connected between a second input node, which receives the lower gamma tap voltage, and the first node, and responsive to the first complementary clock signal;

a fourth switch electrically connected between the second input node and the second node, and responsive to the first clock signal;

a first resistor electrically connected between the first node and a third node;

a second resistor electrically connected between the second node and the third node; and a first amplifier configured to amplify a voltage of the third node and output the first gamma tap voltage to a first output node;

a second gamma division circuit configured to generate a second gamma tap voltage by performing voltage division of the upper gamma tap voltage and the first gamma tap voltage, in response to a second clock signal and a second complementary clock signal; and a third gamma division circuit configured to generate a third gamma tap voltage by performing voltage division of the first gamma tap voltage and the lower gamma tap voltage, in response to the second clock signal and the second complementary clock signal.

2. The gamma tap circuit of claim 1, wherein the second gamma division circuit comprises:

a fifth switch electrically connected between the first input node and a fourth node, and responsive to the second clock signal;

a sixth switch electrically connected between the first input node and a fifth node, and responsive to the second complementary clock signal;

a seventh switch electrically connected between the first output node and the fourth node, and responsive to the second complementary clock signal;

an eighth switch electrically connected between the first output node and the fifth node, and responsive to the second clock signal;

a third resistor electrically connected between the fourth node and a sixth node;

a fourth resistor electrically connected between the fifth node and the sixth node; and a second amplifier configured to amplify a voltage of the sixth node and to output the second gamma tap voltage to a second output node.

3. The gamma tap circuit of claim 2, wherein the third gamma division circuit comprises:

a ninth switch electrically connected between the first output node and a seventh node, and responsive to the second clock signal;

a tenth switch electrically connected between the first output node and an eighth node, and responsive to the second complementary clock signal;

an eleventh switch electrically connected between the second input node and the seventh node, and responsive to the second complementary clock signal;

a twelfth switch electrically connected between the second input node and the eighth node, and responsive to the second clock signal;

a fifth resistor electrically connected between the seventh node and a ninth node;

a sixth resistor electrically connected between the eighth node and the ninth node; and a third amplifier configured to amplify a voltage of the ninth node and to output the third gamma tap voltage to a third output node.

4. The gamma tap circuit of claim 3, wherein the first clock signal and the first complementary clock signal are complementary relative to each other;

wherein the second clock signal and the second complementary clock signal are complementary relative to each other;

wherein a first frequency of the first clock signal is two times a second frequency of the second clock signal; and wherein the first clock signal, the first complementary clock signal, the second clock signal, and the second complementary clock signal are repeated in a first phase, a second phase, a third phase, and a fourth phase, which are sequential in time.

5. The gamma tap circuit of claim 4, wherein during the first phase: (i) the first switch, the fourth switch, the fifth switch, the eighth switch, the ninth switch, and the twelfth switch are turned on, and (ii) the second switch, the third switch, the sixth switch, the seventh switch, the tenth switch, and the eleventh switch are turned off.

6. The gamma tap circuit of claim 4, wherein during the second phase: (i) the second switch, the third switch, the fifth switch, the eighth switch, the ninth switch, and the twelfth switch are turned on, and (ii) the first switch, the fourth switch, the sixth switch, the seventh switch, the tenth switch, and the eleventh switch are turned off.

7. The gamma tap circuit of claim 4, wherein during the third phase: (i) the first switch, the fourth switch, the sixth switch, the seventh switch, the tenth switch, and the eleventh switch are turned on, and (ii) the second switch, the third switch, the fifth switch, the eighth switch, the ninth switch, and the twelfth switch are turned off.

8. The gamma tap circuit of claim 4, wherein during the fourth phase: (i) the second switch, the third switch, the sixth switch, the seventh switch, the tenth switch, and the eleventh switch are turned on, and (ii) the first switch, the fourth switch, the fifth switch, the eighth switch, the ninth switch, and the twelfth switch are turned off.

9. The gamma tap circuit of claim 1, wherein the first amplifier includes:

a non-inverting input terminal electrically connected with the third node;

an inverting input terminal electrically connected with the first output node; and an output terminal electrically connected with the first output node.

10. The gamma tap circuit of claim 1, wherein a resistance value of the first resistor is identical to a resistance value of the second resistor.

11. The gamma tap circuit of claim 1, wherein the first clock signal and the first complementary clock signal are complementary relative to each other;

wherein the second clock signal and the second complementary clock signal are complementary;

wherein a first frequency of the first clock signal is two times a second frequency of the second clock signal; and wherein the first clock signal, the first complementary clock signal, the second clock signal, and the second complementary clock signal are repeated in a first phase, a second phase, a third phase, and a fourth phase which are sequential in time.

12. The gamma tap circuit of claim 11, wherein an average voltage level of the first gamma tap voltage in the first phase and the first gamma tap voltage in the second phase is half of a sum of a voltage level of the upper gamma tap voltage and a voltage level of the lower gamma tap voltage.

13. The gamma tap circuit of claim 12, wherein an average voltage level of the second gamma tap voltage in the first phase, the second gamma tap voltage in the second phase, the second gamma tap voltage in the third phase, and the second gamma tap voltage in the fourth phase is half of a sum of the voltage level of the upper gamma tap voltage and a voltage level of the first gamma tap voltage; and wherein an average voltage level of the third gamma tap voltage in the first phase, the third gamma tap voltage in the second phase, the third gamma tap voltage in the third phase, and the third gamma tap voltage in the fourth phase is half of a sum of the voltage level of the first gamma tap voltage and the voltage level of the lower gamma tap voltage.

14. The gamma tap circuit of claim 12, wherein, during the first phase, a voltage level of the first gamma tap voltage is greater than the sum of the voltage level of the upper gamma tap voltage and the voltage level of the lower gamma tap voltage by as much as an offset voltage of the first amplifier; and wherein, during the second phase, the voltage level of the first gamma tap voltage is less than the sum of the voltage level of the upper gamma tap voltage and the voltage level of the lower gamma tap voltage by as much as the offset voltage of the first amplifier.

15. A gamma tap circuit, comprising:

a first switch electrically connected between a first input node, which receives an upper gamma tap voltage, and a first node, and responsive to a clock signal;

a second switch electrically connected between the first input node and a second node, and responsive to a complementary clock signal;

a third switch electrically connected between a second input node, which receives a lower gamma tap voltage, and the first node, and responsive to the complementary clock signal;

a fourth switch electrically connected between the second input node and the second node, and responsive to the clock signal;

a first resistor electrically connected between the first node and a third node;

a second resistor electrically connected between the second node and the third node; and an amplifier configured to amplify a voltage of the third node and to output a gamma tap voltage to an output node.

16. The gamma tap circuit of claim 15, wherein the clock signal and the complementary clock signal are complementary relative to each other; and wherein the clock signal and the complementary clock signal are repeated in a first phase and a second phase which are sequential in time.

17. The gamma tap circuit of claim 15, wherein a resistance value of the first resistor is identical to a resistance value of the second resistor.

18. A gamma tap circuit, comprising:

a first gamma division circuit configured to generate a first gamma tap voltage by performing voltage division on an upper gamma tap voltage and a lower gamma tap voltage, in-sync with a first clock signal CK1 and a first complementary clock signal CK1*b*, which is 180° out-of-phase relative to CK1;

a second gamma division circuit configured to generate a second gamma tap voltage by performing voltage division on the upper gamma tap voltage and the first gamma tap voltage, in-sync with a second clock signal CK2 and a second complementary clock signal CK2*b*, which is 180° out-of-phase relative to CK2; and a third gamma division circuit configured to generate a third gamma tap voltage by performing voltage division on the first gamma tap voltage and the lower gamma tap voltage, in-sync with CK2 and CK2*b*, which have a lower frequency relative to CK1 and CK1*b*.

19. The gamma tap circuit of claim 18, wherein the first gamma division circuit is configured to generate the first gamma tap voltage by performing voltage division on a summation of the upper gamma tap voltage and the lower gamma tap voltage.

20. The gamma tap circuit of claim 18, wherein the first gamma division circuit is configured to generate the first gamma tap voltage having a magnitude that is proportional to a summation of the upper gamma tap voltage and the lower gamma tap voltage.

21. A display device, comprising:

a display panel including a plurality of pixels;

a timing controller configured to generate a first control signal, a second control signal, and a third control signal;

a gamma voltage generator configured to generate a plurality of gamma voltages in response to the first control signal;

a data driver configured to generate a data signal for controlling brightness of the plurality of pixels in response to the second control signal and the plurality of gamma voltages; and a scan driver configured to generate a scan signal for controlling whether the plurality of pixels emit light, responsive to the third control signal;

wherein the gamma voltage generator includes:

an adjustment circuit configured to generate a first clock signal and a first complementary clock signal in response to the first control signal;

a first gamma division circuit configured to generate a first gamma tap voltage by performing voltage division of an upper gamma tap voltage and a lower gamma tap voltage, in response to the first clock signal and the first complementary clock signal; and a gamma resistor string configured to provide the plurality of gamma voltages in response to the upper gamma tap voltage, the lower gamma tap voltage, and the first gamma tap voltage; and wherein the first gamma division circuit includes:

a first switch electrically connected between a first input node, which receives the upper gamma tap voltage, and a first node, and responsive to the first clock signal;

a second switch electrically connected between the first input node and a second node, and responsive to the first complementary clock signal;

a third switch electrically connected between a second input node, which receives the lower gamma tap voltage, and the first node, and responsive to the first complementary clock signal;

a fourth switch electrically connected between the second input node and the second node, and responsive to the first clock signal;

a first resistor electrically connected between the first node and a third node;

a second resistor electrically connected between the second node and the third node; and a first amplifier configured to amplify a voltage of the third node and to output the first gamma tap voltage to a first output node.

22. The display device of claim 21, wherein the adjustment circuit is further configured to generate a second clock signal and a second complementary clock signal in response to the first control signal;

wherein the gamma resistor string provides the plurality of gamma voltages further based on a second gamma tap voltage and a third gamma tap voltage;

wherein the gamma voltage generator further includes:

a second gamma division circuit configured to generate the second gamma tap voltage by voltage division of the upper gamma tap voltage and the first gamma tap voltage, in response to the second clock signal and the second complementary clock signal; and a third gamma division circuit configured further to generate the third gamma tap voltage by voltage division of the first gamma tap voltage and the lower gamma tap voltage, in response to the second clock signal and the second complementary clock signal;

wherein the second gamma division circuit includes:

a fifth switch electrically connected between the first input node and a fourth node, and responsive to the second clock signal;

a sixth switch electrically connected between the first input node and a fifth node, and responsive to the second complementary clock signal;

a seventh switch electrically connected between the first output node and the fourth node, and responsive to the second complementary clock signal;

an eighth switch electrically connected between the first output node and the fifth node, and responsive to the second clock signal;

a third resistor electrically connected between the fourth node and a sixth node;

a fourth resistor electrically connected between the fifth node and the sixth node; and a second amplifier configured to amplify a voltage of the sixth node and to output the second gamma tap voltage to a second output node; and wherein the third gamma division circuit includes:

a ninth switch electrically connected between the first output node and a seventh node, and responsive to the second clock signal;

a tenth switch electrically connected between the first output node and an eighth node, and responsive to the second complementary clock signal;

an eleventh switch electrically connected between the second input node and the seventh node, and responsive to the second complementary clock signal;

a twelfth switch electrically connected between the second input node and the eighth node, and responsive to the second clock signal;

a fifth resistor electrically connected between the seventh node and a ninth node;

a sixth resistor electrically connected between the eighth node and the ninth node; and a third amplifier configured to amplify a voltage of the ninth node and to output the third gamma tap voltage to a third output node.

23. The display device of claim 22, wherein the first clock signal and the first complementary clock signal are complementary relative to each other; wherein the second clock signal and the second complementary clock signal are complementary relative to each other; and wherein a first frequency of the first clock signal is two times a second frequency of the second clock signal.

* * * * *